US009623362B2

(12) United States Patent
Brown

(10) Patent No.: US 9,623,362 B2
(45) Date of Patent: Apr. 18, 2017

(54) FILTRATION MEDIA PACK, FILTER ELEMENTS, AND AIR FILTRATION MEDIA

(71) Applicant: DONALDSON COMPANY, INC., Minneapolis, MN (US)

(72) Inventor: Scott M. Brown, Lakeville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 219 days.

(21) Appl. No.: 14/591,731

(22) Filed: Jan. 7, 2015

(65) Prior Publication Data

US 2015/0211452 A1 Jul. 30, 2015

Related U.S. Application Data

(60) Provisional application No. 61/924,696, filed on Jan. 7, 2014, provisional application No. 62/077,891, filed on Nov. 10, 2014.

(51) Int. Cl.
| | | |
|---|---|---|
| *B01D 46/52* | (2006.01) | |
| *B01D 46/00* | (2006.01) | |
| *F02M 35/024* | (2006.01) | |

(52) U.S. Cl.
CPC ....... *B01D 46/525* (2013.01); *B01D 46/0023* (2013.01); *B01D 46/522* (2013.01); *B01D 46/526* (2013.01); *B01D 46/527* (2013.01); *F02M 35/0245* (2013.01)

(58) Field of Classification Search
CPC B01D 46/0023; B01D 46/522; B01D 46/525; B01D 46/526; B01D 46/527; F02M 35/0245
See application file for complete search history.

(56) References Cited

U.S. PATENT DOCUMENTS

| | | | |
|---|---|---|---|
| 4,344,899 A | 8/1982 | Monjoie | |
| 6,273,938 B1 | 8/2001 | Fanselow et al. | |
| 6,280,824 B1 | 8/2001 | Insley et al. | |
| 7,997,425 B2 | 8/2011 | Golden et al. | |

FOREIGN PATENT DOCUMENTS

| | | |
|---|---|---|
| DE | 102004058590 | 8/2006 |
| EP | 0582286 | 2/1994 |
| EP | 1990510 | 11/2008 |
| JP | 60071018 | 4/1985 |
| JP | 61222520 | 10/1986 |
| JP | 61200116 | 12/1986 |
| WO | 2009003119 | 12/2008 |
| WO | 2015105887 | 7/2015 |

OTHER PUBLICATIONS

International Search Report and Written Opinion for PCT/US2015/010497, mailed May 13, 2015 (10 pages).
Communication Pursuant to Rules 161(1) and 162 EPC for European Patent Application No. 15701440.8 mailed Sep. 15, 2016 (2 pages).
International Preliminary Report on Patentability for PCT/US2015/010497 mailed Jul. 21, 2016 (7 pages).

*Primary Examiner* — Robert Clemente
(74) *Attorney, Agent, or Firm* — Pauly, Devries, Smith & Deffner, LLC

(57) ABSTRACT

A filtration media pack including a plurality of layers of filter media is disclosed. The media pack includes fluted sheets and a facing sheet, with a plurality of flutes extending between the fluted sheets and the facing sheets. In an embodiment, the fluted sheet includes a plurality of protrusions that contact the facing sheet.

20 Claims, 32 Drawing Sheets

FILTRATION MEDIA PACK, FILTER ELEMENTS, AND AIR FILTRATION MEDIA

FIELD OF THE INVENTION

The present invention relates to filtration media packs that can be used to form filter elements. The invention additionally relates to filter elements and filtration media.

BACKGROUND OF THE INVENTION

Fluid streams, such as air streams, often carry contaminant material. In many instances it is desired to filter some or all of the contaminant materials from the fluid streams. For example, particulate contaminants can be carried by air streams into internal combustion engines for motorized vehicles or for power generation equipment. It is preferred for such systems that selected contaminant material, such as particulate contaminants, be removed from (or have its level reduced in) the air stream.

A variety of fluid filter arrangements have been developed for contaminant reduction. In general, however, continued improvements are sought.

SUMMARY OF THE INVENTION

The present disclosure is directed to a filtration media pack containing a plurality of layers of media, including fluted sheets and facing sheets, as well as filter media packs, filter elements and filter media. In certain embodiments a plurality of flutes extend between the fluted sheets and the facing sheets, with a first portion of the plurality of flutes closed to unfiltered air flowing into the first portion of the plurality of flutes, and a second portion of the plurality of flutes closed to unfiltered air flowing out of the second portion of the plurality of flutes. Air passing into one face of the media pack and out the other face passes through media to provide filtration of the air. In specific embodiments the fluted sheet comprises a plurality of protrusions, at least a portion of the protrusions contacting the facing sheet. In other specific embodiments the facing sheet comprises a plurality of protrusions, at least a portion of the protrusions contacting the fluted sheet. It will be understood that in some implementations other portions of the flutes are plugged, such that closing of the flutes can occur at either end of the flutes or at interior locations of the flutes (such as half way from the ends of the flutes).

The filtration media pack can include protrusions having, for example, a height of from 0.2 to 3 millimeters. In some embodiments the protrusions have a height from 0.4 to 24 times the thickness of the media forming the fluted sheet. In an embodiment the protrusions have a height of less than 3 times the thickness of the media forming the fluted sheet. In certain implementations the protrusions have a height of at least 2 times the thickness of the media forming the fluted sheet. Optionally the protrusions are from 10 to 90 percent of the height of the flutes in the fluted sheet. Thus, the height of the protrusions can add, for example from 10 to 90 percent to the height of the flutes excluding the protrusions. In some embodiments the protrusions are less than 30 percent of the height of the flutes in the fluted sheet. The protrusions may be, for example, at least 15 percent of the height of the flutes in the fluted sheet. The protrusions are from 1 to 20 percent of the width of the flutes in the fluted sheet in example implementations. In specific embodiments the protrusions are less than 10 percent of the width of the flutes in the fluted sheet. The protrusions can be, for example, at least 5 percent of the width of the flutes in the fluted sheet.

The protrusions between a first face of the filtration media pack and a second face of the filtration media pack can be of equal height in some embodiments, but vary in height in other embodiments. The protrusions between the first face of the filtration media pack and the second face of the filtration media pack can be tapered in height with respect to each other.

The filtration media pack can be used to filter a fluid that is a gaseous or liquid substance. An exemplary gaseous substance that can be filtered using the filtration media is air, and exemplary liquid substances that can be filtered using the filtration media include water, oil, fuel, and hydraulic fluid. The filtration media pack can be used to separate or remove at least a portion of a component from a fluid to be filtered. The component can be a contaminant or another material targeted for removal or separation. Exemplary contaminants and materials targeted for removal include those characterized as solids, liquids, gases, or combinations thereof. The contaminants or materials targeted for removal can include particulates, non-particulates, or a mixture thereof. Materials targeted for removal can include chemical species that can be captured by the media. In certain implementations the media surface can remove contaminants without passing fluids (liquids or gases) through the media, in which case the flutes can be open along their length, rather than closed. The reference to removal of components and contaminants should be understood to refer to the complete removal or separation or a partial removal or separation.

The protrusions can be formed, for example, by a roller or other device having raised areas and depressions corresponding to the flutes and protrusions.

This summary is an overview of some of the teachings of the present application and is not intended to be an exclusive or exhaustive treatment of the present subject matter. Further details are found the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

The invention may be more completely understood in connection with the following drawings, in which.

Figure 1:
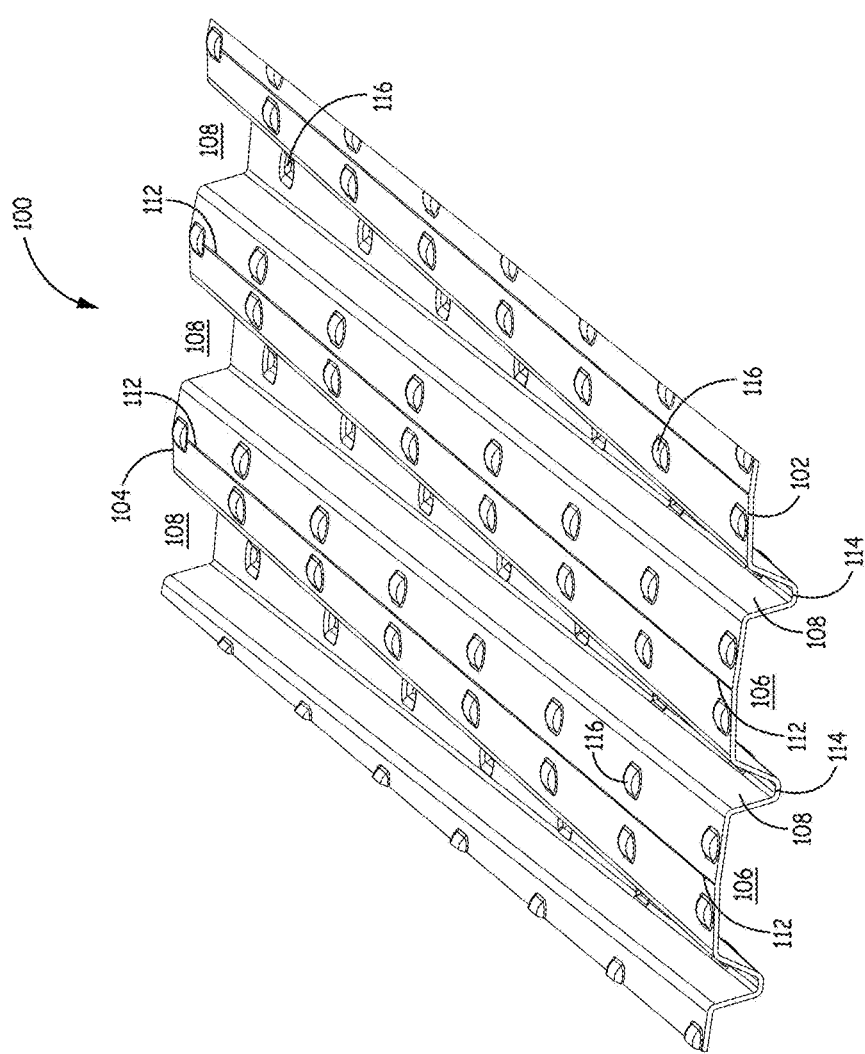
FIG. 1 is a perspective view of a sheet of fluted filter media, constructed and arranged according to an embodiment of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The present disclosure is directed to fluid filtration media packs, such as gas or filtration media packs containing a plurality of layers of media, including fluted sheets and facing sheets. The filtered gaseous fluid can be, for example, air. A plurality of flutes extend between the fluted sheets and the facing sheets. In certain implementations a first portion of the plurality of flutes is closed to unfiltered air flowing into the first portion of the plurality of flutes, and a second portion of the plurality of flutes is closed to unfiltered air flowing out of the second portion of the plurality of flutes. Air passing into the media pack and out the other face passes through media to provide filtration of the air. In specific embodiments the fluted sheet comprises a plurality of protrusions, at least a portion of the protrusions contacting the facing sheet. In other specific embodiments the facing sheet comprises a plurality of protrusions, at least a portion of the protrusions contacting the fluted sheet.

In certain embodiments the repeating pattern of flutes comprises at least one ridge extending along at least a portion of the flute length between adjacent peaks. The ridge can comprise a discontinuity in the curvature of the flute between the adjacent peaks. The flutes often also contain a central peak. Often the protrusions are positioned on either side of this peak. In some embodiments the protrusions are located on the peak itself. In either configuration the protrusions are configured to reduce masking between the fluted sheet and facing sheet. Masking can refer to areas of filter material that have restricted or reduced fluid flow, such as due to a blockage or contact. Masking refers to areas where two sheets of filter material can contact each other and reduce fluid flow through the sheets of filtration media thereby decreasing the amount of usable filter material.

The protrusions are generally small protrusions or other extensions extending upward from the surface of the media. In typical embodiments large numbers of protrusions will be present on the fluted media. The protrusions, when viewed from above the media surface can be, for example, round, oval, elliptical, or polygonal. Typically the protrusions will have curved edges so as to minimize media strain. The protrusions can vary in size and shape, and upstream surfaces of the media often have different shapes, sizes, and/or numbers of protrusions than the downstream surfaces. Indeed, it is possible to have protrusions on just one side of the media, either on the upstream side or the downstream side.

Thus, in some implementations the flutes contain peaks, wherein the peaks do not substantially contact the facing sheet along the entire length of the flutes because the flutes are held off the facing sheets by the protrusions. In certain aspects the filtration media pack includes a plurality of layers of single face media comprising a fluted sheet, a facing sheet, and a plurality of flutes extending between the fluted sheet and the facing sheet. A first portion of the plurality of flutes is closed to unfiltered air flowing into the first portion of the plurality of flutes, and a second portion of the plurality of flutes is closed to unfiltered air flowing out of the second portion of the plurality of flutes, such that air passing into one of the first face or the second face of the media pack and out the other of the first face or the second face of the media pack passes through media to provide filtration of the fluid (such as air). At least one of the flutes comprises at least one contact region, the contact region comprising at least one island extending from at least one of the facing sheet and fluted sheet.

In certain implementations the filtration media pack comprises a plurality of layers of single face media wherein the layers of single face media comprise a fluted sheet, a facing sheet, and a plurality of flutes extending between the fluted sheet and the facing sheet and having a flute length extending from a first face of the filtration media pack to a second face of the filtration media pack. A first portion of the plurality of flutes is closed to unfiltered air flowing into the first portion of the plurality of flutes, and a second portion of the plurality of flutes is closed to unfiltered air flowing out of the second portion of the plurality of flutes, so that air passing into one of the first face or the second face of the media pack and out the other of the first face of the second face of the media pack passes through media to provide filtration of the air. The fluted sheet includes, in such implementations, repeating internal peaks facing toward the facing sheet and repeating external peaks facing away from the facing sheet. A repeating pattern of flutes comprise at least one ridge extending along at least a portion of the flute length between adjacent peaks. A plurality of island protrusions extend from the flute and contacting the facing sheet, wherein at least one of the plurality of protrusions is located between a ridge and a peak of the flute. The island protrusions extend above a region of media substantially free of protrusions.

In some implementations the filtration media pack has a plurality of layers of single face media comprising a fluted sheet, a facing sheet, and a plurality of flutes extending between the fluted sheet and the facing sheet. A first portion of the plurality of flutes is closed to unfiltered air flowing into the first portion of the plurality of flutes, and a second portion of the plurality of flutes is closed to unfiltered air flowing out of the second portion of the plurality of flutes, such that air passing into one of the first face or the second face of the media pack and out the other of the first face or the second face of the media pack passes through media to provide filtration of the air. The fluted sheet further comprises a plurality of protrusions, the protrusions being non-uniformly distributed along the fluted sheet.

The filtration media pack can comprise a plurality of layers of single face media comprising a fluted sheet, a facing sheet, and a plurality of flutes extending between the fluted sheet and the facing sheet. A first portion of the plurality of flutes is closed to unfiltered air flowing into the first portion of the plurality of flutes, and a second portion of the plurality of flutes being closed to unfiltered air flowing out of the second portion of the plurality of flutes, such that air passing into one of the first face or the second face of the media pack and out the other of the first face or the second face of the media pack passes through media to provide filtration of the air. The fluted sheet also includes a plurality of protrusions, the protrusions making contact with the facing sheet. The protrusions are substantially absent from the portions of the fluted sheet not in contact with the facing sheet.

In some embodiments the filtration media pack comprises a plurality of layers of single face media comprising a fluted sheet, a facing sheet, and a plurality of flutes extending between the fluted sheet and the facing sheet. A first portion of the plurality of flutes is closed to unfiltered air flowing into the first portion of the plurality of flutes, and a second portion of the plurality of flutes is closed to unfiltered air flowing out of the second portion of the plurality of flutes, such that air passing into one of the first face or the second face of the media pack and out the other of the first face or the second face of the media pack passes through media to provide filtration of the air. The fluted sheet comprises a plurality of protrusions, the protrusions covering only a portion of the fluted sheet.

The filtration media pack can include a plurality of layers of single face media comprising a fluted sheet, a facing sheet, and a plurality of flutes extending between the fluted sheet and the facing sheet. A first portion of the plurality of flutes is closed to unfiltered air flowing into the first portion of the plurality of flutes, and a second portion of the plurality of flutes being closed to unfiltered air flowing out of the second portion of the plurality of flutes, such that air passing into one of the first face or the second face of the media pack and out the other of the first face or the second face of the media pack passes through media to provide filtration of the air. The fluted sheet comprises a plurality of protrusions extending from a remainder of the fluted sheet, the protrusions having a non-constant cross-section on the fluted sheet in all axes.

In reference now to the figures, FIG. 1 shows a perspective view of a fluted sheet 100 of filter media. The fluted sheet 100 can include a first edge 102 and a second edge 104. The fluted sheet 100 can include one or more flutes 106, such as a channel or a peak and a valley. The flutes 106 can extend from the first edge 102 to the second edge 104. The fluted sheet 100 can include first flutes 106 on one side of the fluted sheet 100 and second flutes 108 on the opposite side of the fluted sheet 100. The flutes 106, 108 can be asymmetric, such as when the first flutes 106 have a different shape or cross sectional area than the second flutes 108.

When formed into a media pack or filter element, the first flutes 106 can be closed to unfiltered air flowing into the second flute 108, such that air in the second flute 108 has been filtered. The flutes can be tapered, such as having a larger opening on one of the ends compared to the other end. In the embodiment of FIG. 1, the flutes are tapered, such that the first flute 106 is larger than the second flute 108 at the first edge 102, and the second flute 108 is larger than first flute 106 at the second edge 104. In some embodiments the media includes tapered and non-tapered portions. For example, a first portion of the media can be tapered, with a second portion not being tapered. In an example embodiment upstream portion of the media is substantially non-tapered for the majority of the length of the flute, with tapering of the downstream portion only. In some embodiments at least half of the upstream length of the flutes is not tapered, while in other embodiments at least three quarters of the upstream length of the flutes is not tapered.

The fluted sheet 100 can include repeating peaks 112, 114 and a plurality of protrusions 116. The protrusions 116 can be disposed on a peak 112, 114, or adjacent to a peak, such as just offset from the tip of the peak. The protrusions 116 can be discontinuous, such that there are portions along the flutes 106 between the first edge 102 and the second edge 104 that do not include a protrusion. The protrusions 116 can be arced, such as having a non-planar top surface. The protrusions 116 can be of a consistent height, size or shape, or of a varied height, size or shape. The protrusions 116 can be tapered, such that protrusions 116 closer to the first edge 102 are taller or shorter than protrusions that are closer to the second edge 104.

Figure 2:
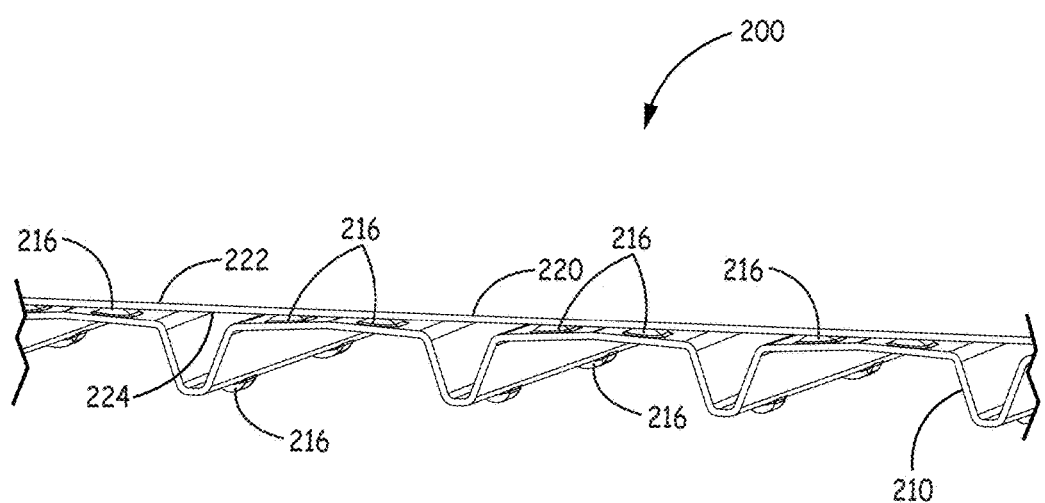
FIG. 2 is a perspective view of a sheet of fluted filter media and a sheet of facer media, constructed and arranged according to an embodiment of the invention.

Referring now to FIG. 2, single face media 200 is shown, which includes a fluted sheet 210 and a facing sheet 220. In an embodiment, the facing sheet 220 can be substantially planar. In an embodiment, the facing sheet 220 can include a first surface 222 and a second surface 224. Facing sheet 220 contacts a plurality of protrusions 216 in fluted sheet 110, which reduce masking between the fluted sheet 210 and second surface 224 of the facing sheet 220 by limiting contact between the fluted and facing sheets 210, 220.

Figure 3:
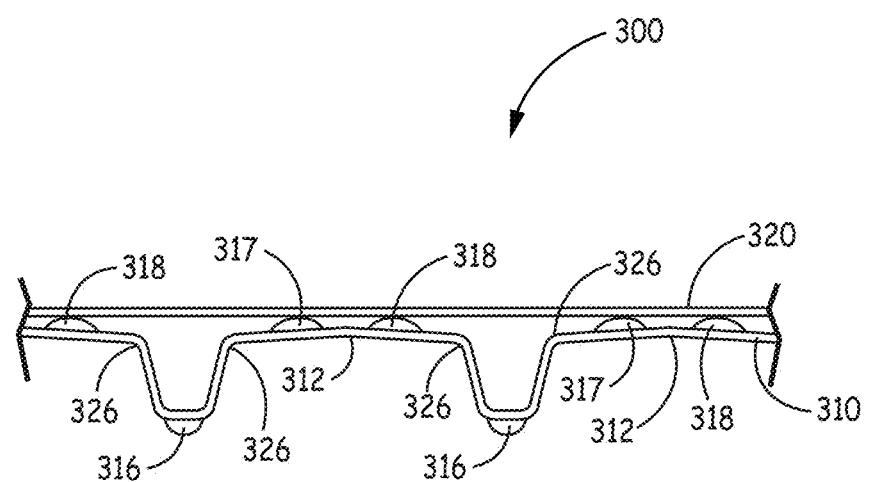
FIG. 3 is a front view of a sheet of fluted filter media and a sheet of facer media, constructed and arranged according to an embodiment of the invention.

FIG. 3 shows media 300 including a fluted sheet 310 and a facing sheet 320. The fluted sheet 310 can included one or more protrusions, such as protrusions 317 and 318. Protrusions 317 are disposed on one side of a peak 312 and a protrusion 318 is disposed on the opposite side of the peak 312. In an embodiment, the peaks 312 do not contact the facing sheet 320, such as to prevent masking. The fluted sheet 310 can include one or more ridges 326, as shown in FIG. 3. The ridges 326 can be discontinuities in the curve of the fluted sheet 310. In an embodiment, the ridges 326 can be an inflection point, such as where the fluted sheet 310 changes from concave up to concave down, or from concave down to concave up. In an embodiment, the first protrusion 317 can be disposed between a ridge 326 and a flute peak 312. The second protrusion 318 can be disposed on the opposite side of the peak 312 and between the peak 312 and a different ridge 326. The fluted sheet 310 can also include one or more additional protrusions 316, such as at peak 314 on alternative peaks as shown in FIG. 3. It will be understood that in some implementations the protrusions 316, 317, 318 do not make contact with a facing sheet except when the element is under pressure, at which point media deflection causes contact.

Figure 4:
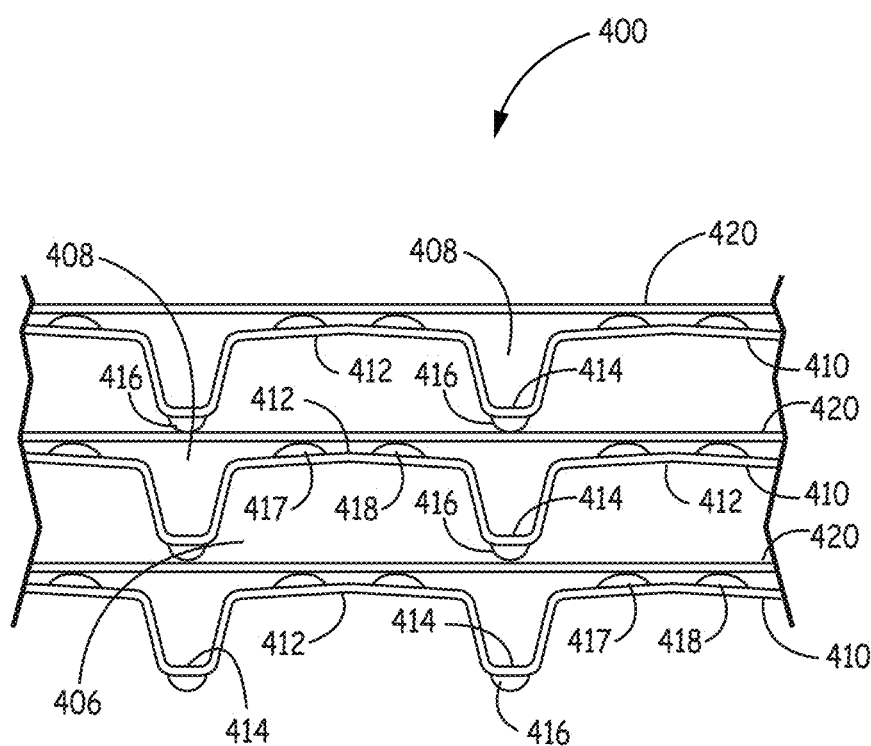
FIG. 4 is a front view of a plurality of sheets of fluted and facer media, constructed and arranged according to an embodiment of the invention.

FIG. 4 shows a front view of a media pack 400 depicting a plurality of fluted sheets 410 and a plurality of facing sheets 420. The fluted sheets 410 and facing sheets 420 are shown stacked on each other in an alternating pattern. Fluted sheet 410 includes flutes 406 and 408. Flutes 406 are shown as having a significantly larger cross sectional area than those of flutes 408 in the depicted embodiment. This greater cross sectional area allows for a greater volume on one side of the media pack. In some embodiments the side with greatest volume is the upstream side, which allows for greater dust loading volume on the upstream side of the media. In the depicted embodiment, peaks 412 do not contact the facing sheet 420. The adjacent peaks 414 also do not contact the facing sheet 420 in this depicted embodiment. The protrusions 416, 417, and 418 are the only portions of the fluted sheet 410 that significantly contacts the facing sheet 420 in certain embodiments.

This difference in upstream and downstream volumes can be characterized as flute channel volume asymmetry (also called media volume asymmetry). Media volume asymmetry occurs when one side of a media pack (either the upstream or downstream side) has a different volume than the other side of the media pack. Such asymmetry may be created by the manner in which the flutes are constructed, such as by having the flutes taper in cross sectional area. Media volume asymmetry, as used herein, generally measures the media volume ratio of the larger media volume bounded by the flute peaks to the smaller media volume bounded by opposite flute peaks. In some, but not all implementations, the larger media volume corresponds to the upstream open media volume, and the smaller media volume corresponds to the downstream open media volume (during use the upstream volume may accumulate contaminants, such as dust).

Media volume asymmetry is beneficial for various reasons, including improved fluid flow and improved loading performance. In some implementations media will demonstrate a media volume asymmetry of more than 1%, more than 3%, more than 5%, or more than 10%. Example media constructions demonstrate a media volume asymmetry of greater than 15%, greater than 20%, greater than 50%, greater than 75%, greater than 100%, greater than 150%, and greater than 200%. Suitable media volume asymmetry ranges includes, for example, 1% to 300%, 5% to 200%; 50% to 200%; 100% to 200%; and 100% to 150%. Tapered flutes may incorporate media volume asymmetry to further enhance filter performance.

Media packs containing tapered flutes may also demonstrate media cross-sectional area asymmetry, which is calculated based upon a cross-section of the media at any given point. In a tapered flute, the cross-sectional area asymmetry will vary with measurement location along the depth of the fluted media pack. It will be understood that cross-sectional area asymmetry may lead to media volume asymmetry, but this is not always the case because tapered media cross sectional areas can be varied along the length of the flute so as to have a cumulative effect that the total volume on each side of the media is equal. Also, a given cross section of a media pack may indicate a higher cross-sectional area on an upstream side of the media, but subsequent tapering of the media could cause the overall media volume asymmetry to favor the downstream side in terms of total media volume.

In some embodiments the media pack will have a cross-sectional area asymmetry such that one side of the media has cross sectional area at least 1 percent greater than the opposite side the same piece of media. Often the difference in cross-sectional area across the media will be more than 3%, more than 5%, or more than 10%. Example media constructions demonstrate a media cross sectional area asymmetry of greater than 15%, greater than 20%, greater than 50%, greater than 75%, greater than 100%, greater than 150%, and greater than 200%. Suitable media cross sectional area asymmetry ranges includes, for example, 1% to 300%, 5% to 200%; 50% to 200%; 100% to 200%; and 100% to 150%.

The differences in cross sectional area are controlled by geometry of the flute design. Often the presence, number, and shape of ridges along the flutes significantly impacts the amount of cross sectional area asymmetry. Tapering of the flutes will generally result in a change in the cross sectional area asymmetry along the flute length. However, this is not always true, such as when the height of a flute changes but the width is kept constant, such that the cross sectional area does not change. In such embodiments it is sometimes possible to keep the total cross sectional area constant by changing the relative position of ridges along the flute (or otherwise changing the distribution of the media along the flute or by changing the radius of the flute).

Flute geometry that results in differences in cross sectional area can significantly impact flow properties through the flutes. Changes in relative cross sectional area of flutes typically results in changes in the cross sectional area of the upstream and downstream portion of the media pack in that area: If the upstream portion of the media pack undergoes an increase in cross sectional area, then the downstream portion of the media pack will also typically undergo a decrease in cross sectional area. The present invention allows for customization of media volume asymmetry and cross-sectional area asymmetry to improve filter performance.

Figure 5:
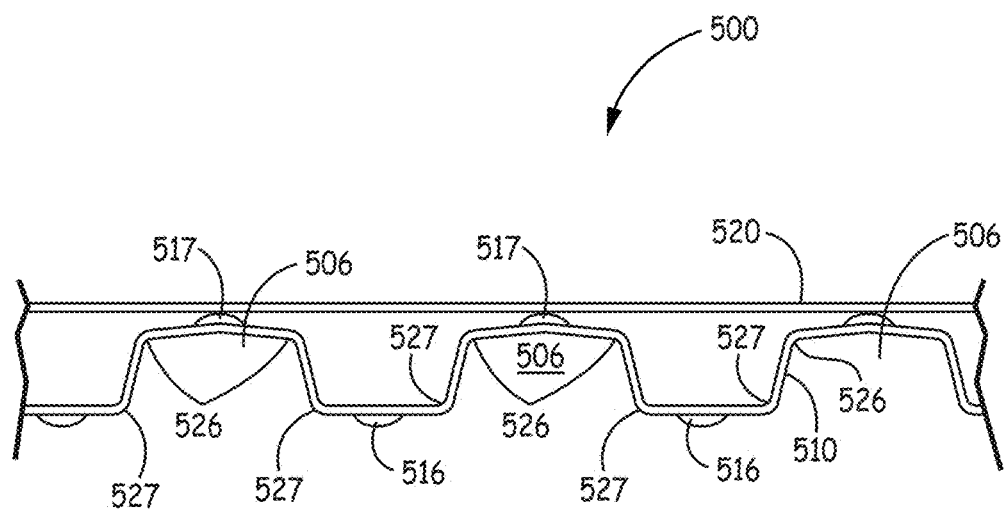
FIG. 5 is a front view of a sheet of fluted filter media and a sheet of facer media, constructed and arranged according to an embodiment of the invention.

FIG. 5 shows media pack 500 including a fluted sheet 510 and a facing sheet 520. The fluted sheet 510 can included one or more protrusions, such as protrusions 516 and 517. Protrusions 516 are disposed on one side of a flute and protrusions 517 are disposed on the opposite side of the flute. The media pack 500 of FIG. 5 also shows ridges 526 and 527 along flutes 506.

Figure 6:
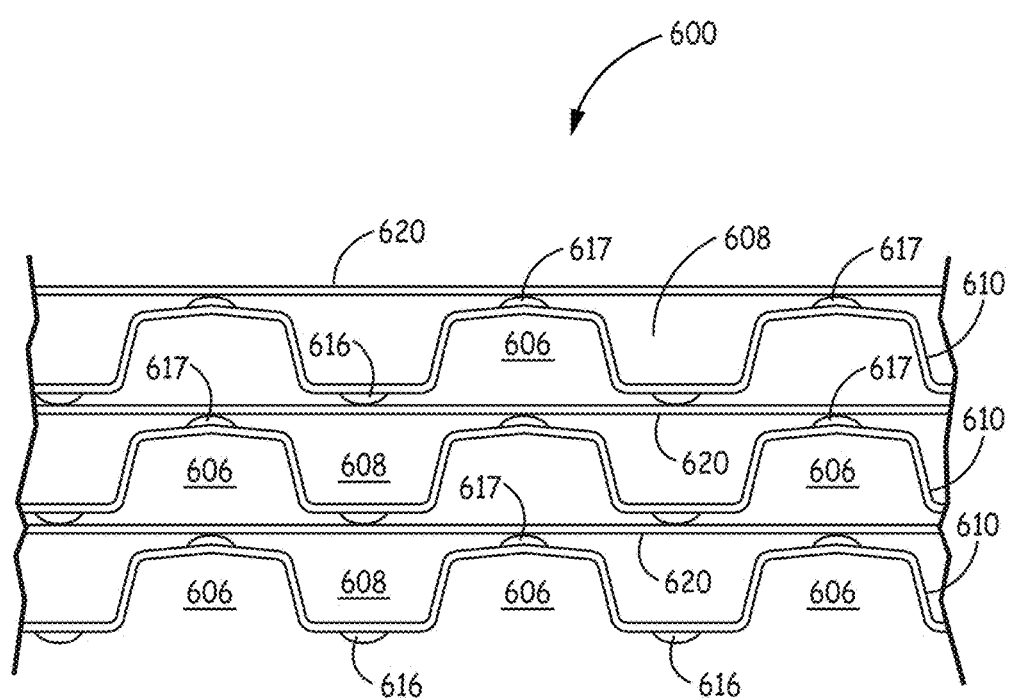
FIG. 6 is a front view of a plurality of sheets of fluted and facer media, constructed and arranged according to an embodiment of the invention.

FIG. 6 shows a front view of a media pack 600 with a plurality of fluted sheets 610 and a plurality of facing sheets 620. The fluted sheets 610 and facing sheets 620 are shown stacked on each other in an alternating pattern, with protrusions 616 and 617 contacting facing sheets 620. Flutes 606 and 608 are shown depicted in FIG. 6. The upstream ends of either flutes 606 or 608 are typically plugged (such as by a bead seal, although it will be appreciated in some implementations the ends of the flutes are not plugged, or additional plugging occurs at other locations along at least some of the flutes), while the downstream end of the other flutes 606 or 608 are typically plugged near the downstream end of the flute. Thus, for example, if the upstream ends of flutes 606 are plugged, then the downstream ends of flutes 606 are typically open, while the upstream ends of flutes 608 are open and the downstream ends of flutes 608 are closed. It will be understood that often the upstream flutes (those with downstream plug) have a volume greater than the downstream flutes.

Figure 7:
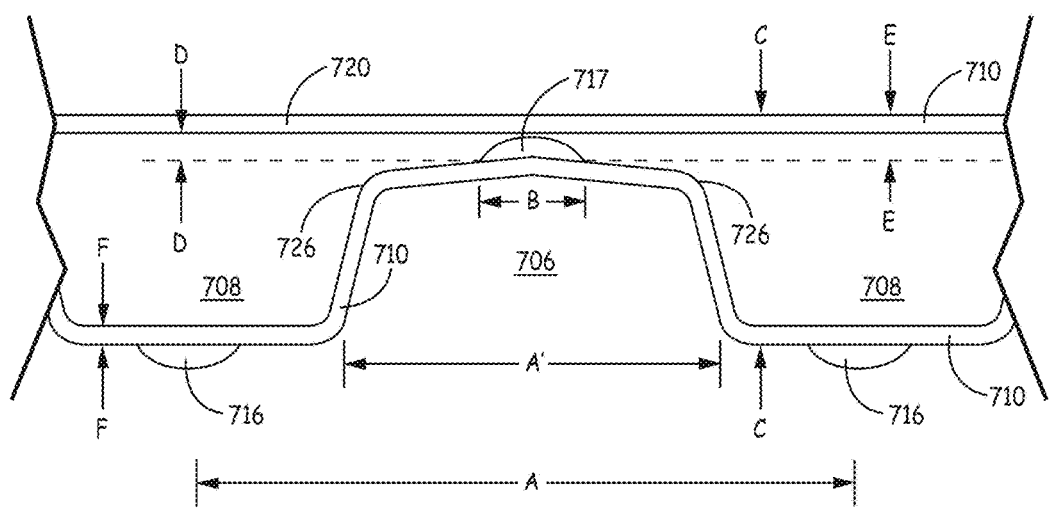
FIG. 7 is an enlarged front view of a sheet of fluted media and facer media constructed and arranged according to an embodiment of the invention, showing dimensions of example flutes.

Now in reference to FIG. 7, an enlarged front view of a sheet of fluted media 710 and facer media 720 constructed and arranged according to an embodiment of the invention is shown with dimensions of example flutes. The fluted sheet 710 can includes flutes 706. The fluted sheet 710 includes first flutes 706 on one side of the fluted sheet 710 and second flutes 708 on the opposite side of the fluted sheet 710. The flutes 706 in the depicted embodiment have a width A measured from a first one peak 716 to adjacent peak 716. In example embodiments width A is from 0.75 to 0.125 inches, optionally from 0.5 to 0.25 inches, and optionally from 0.45 to 0.3 inches.

The protrusions 717 in the depicted embodiment have a width B. In example embodiments width B is from 0.2 to 0.02 inches, optionally from 0.15 to 0.05 inches, and optionally from 0.1 to 0.075 inches. Width B can also be expressed as a multiple of the thickness F of the media forming fluted sheet 710. In example embodiments the width B is from 20 to 1 times the thickness F of the media forming fluted sheet 710. In certain embodiments the fluted width B of the protrusions is from 10 to 7 times the thickness F of media forming fluted sheet 710. In some implementations the protrusions 717 have a width extending along most or all of the flute width, such as the distance A' shown in FIG. 7.

The flutes 706 in the depicted embodiment have a height C. In example embodiments height C is from 0.5 to 0.05 inches, optionally from 0.25 to 0.075 inches, and optionally from 0.15 to 0.1 inches.

The protrusions 717 in the depicted embodiment have a height D. In example embodiments height D is from 0.1 to 0.005 inches, optionally from 0.05 to 0.01 inches, and optionally from 0.025 to 0.015 inches. Height D can also be expressed as a multiple of the thickness of the media forming fluted sheet 710. In example embodiments the height D is from 10 to 0.5 times the thickness of the media forming fluted sheet 710. In certain embodiments the height D of the protrusions is from 2 to 1 times the thickness of media forming fluted sheet 710. Also shown in FIG. 7 is the combined thickness E of the protrusion 717 and facer sheet 720. In certain embodiments this combined thickness E will be from 0.11 to 0.015 inches, or from 0.06 to 0.02 inches, or from 0.035 to 0.025 inches. The height of the protrusions 716 can be similar or different from the protrusions 717, and thus can be, for example from 0.1 to 0.005 inches, optionally from 0.05 to 0.01 inches, and optionally from 0.025 to 0.015 inches.

Figure 8:
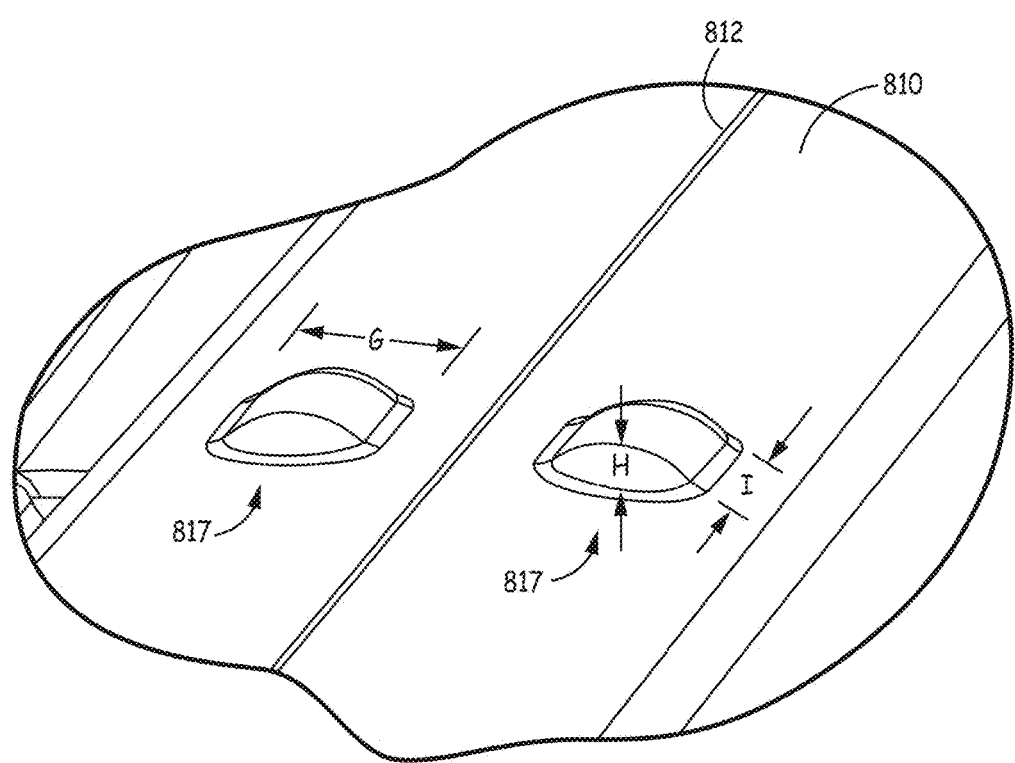
FIG. 8 is an enlarged perspective view of a sheet of fluted media and facer media constructed and arranged according to an embodiment of the invention, showing dimensions of example protrusions on the flutes.

FIG. 8 is an enlarged perspective view of a sheet of fluted media 810 constructed and arranged according to an embodiment of the invention, showing dimensions of example protrusions 872 on the media, and also showing a flute peak 812. The protrusions 817 are shown with example length G, height H, and width I. The height of the protrusion can refer to the distance between the top of the protrusion and the flat portion of filtration media, represented by line. In an embodiment, the average height of protrusions can range from 0.005 inches to 0.05 inches.

In an embodiment, the average height of the protrusions on a first surface can be less than or equal to 0.01 inches. In an embodiment, the average height of the protrusions on a first surface can be less than or equal to 0.05 inches. In an embodiment, the average height of the protrusions on a second surface can be 0.0275 inches. In an embodiment, the average upstream protrusion height can be at least 50% greater than the average downstream protrusion height. In an embodiment, the protrusions can have an average height of 0.017. In an embodiment the protrusions have an average height of 500 to 50 percentage of the media thickness.

The protrusions size or protrusion width can vary, depending on the application. The protrusions can vary in width from 0.2 inches to 0.02 inches. In and embodiment, the protrusions have an average width of 20000 to 200 percentage of the media thickness. In an embodiment, the protrusions can cover from 20% to 1% of the surface area of the filtration media.

Figure 9:
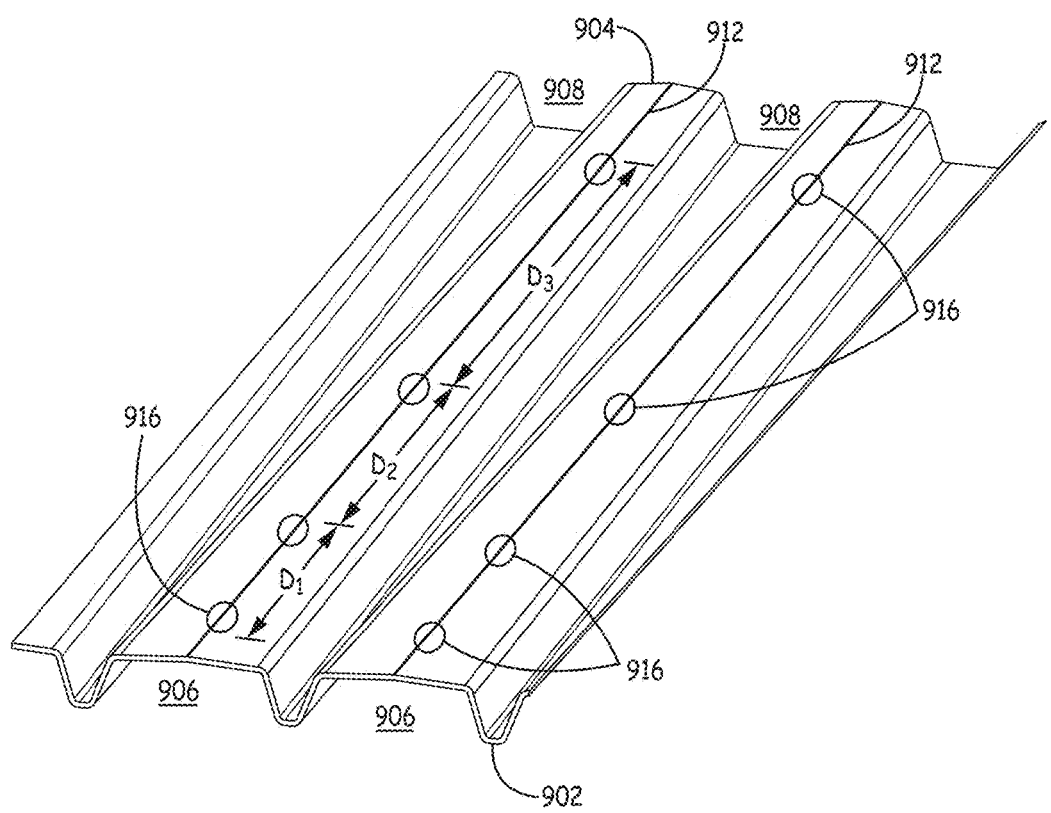
FIG. 9 is a perspective view of a sheet of fluted filter media, constructed and arranged according to an embodiment of the invention, showing variable spacing of protrusions on the fluted filter media.

FIG. 9 is a perspective view of a sheet of fluted filter media, constructed and arranged according to an embodiment of the invention, showing variable spacing of protrusions on the fluted filter media. The fluted sheet 900 can include a first edge 902 and a second edge 904. The fluted sheet 900 can include one or more flutes 906, such as a channel or a peak and a valley. The flutes 906 can extend from the first edge 902 to the second edge 904. The fluted sheet 900 can include first flutes 906 on one side of the fluted sheet 900 and second flutes 908 on the opposite side of the fluted sheet 900. The flutes 906, 908 can be asymmetric, such as when the first flutes 906 have a different shape than the second flutes 908. Distances between protrusions 916 are shown as distance D1, D2, and D3. In the depicted embodiment distance D1 is less than distance D2, which is less than distance D3. Thus, in this example implementation the distance between protrusions 916 increases further from first edge 902. In other implementations the distance between protrusions 916 can decrease further from first edge 902.

Figure 10:
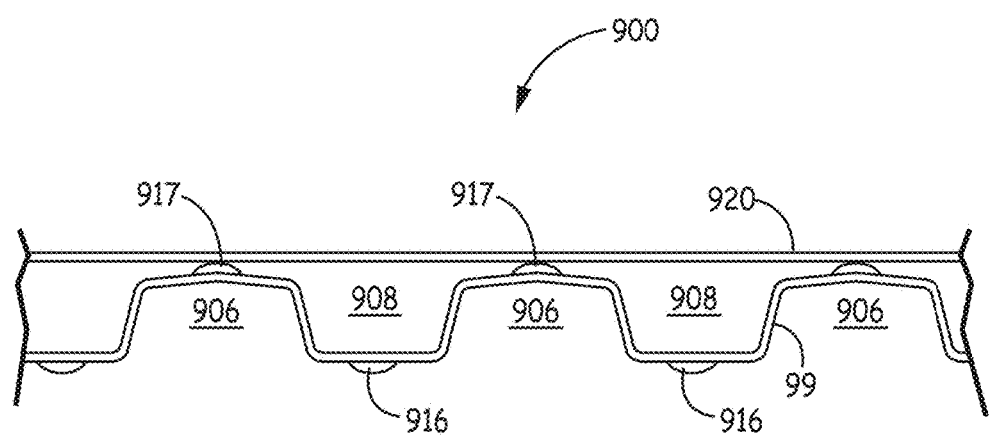
FIG. 10 is a front view of a sheet of fluted filter media and a sheet of facer media, constructed and arranged according to an embodiment of the invention shown in FIG. 9.

FIG. 10 is a front view of a sheet of fluted filter media and a sheet of facer media 920, constructed and arranged according to an embodiment of the invention shown in FIG. 9. The facing sheet 920 can be substantially planar. Facing sheet 920 contacts a plurality of protrusions 916 in fluted sheet 900, which reduce masking between the fluted sheet 910 and second surface 924 of the facing sheet 920 by limiting contact between the fluted and facing sheets 910, 920.

Figure 11:
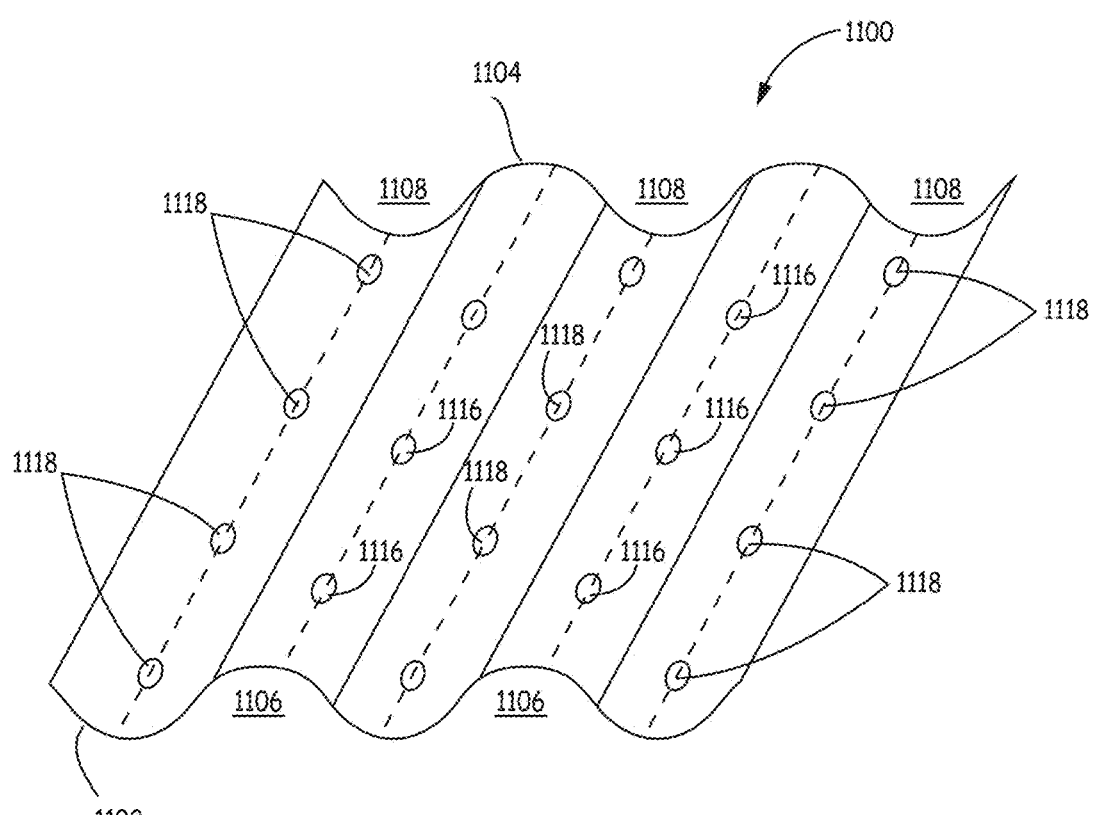
FIG. 11 is a perspective view of a sheet of fluted filter media, constructed and arranged according to an embodiment of the invention.

FIG. 11 is a perspective view of a sheet of fluted filter media, constructed and arranged according to an embodiment of the invention, showing variable spacing of protrusions on the fluted filter media. The fluted sheet 1100 can include a first edge 1102 and a second edge 1104. The fluted sheet 1100 can include one or more flutes 1106, such as a channel or a peak and a valley. The flutes 1106 can extend from the first edge 1102 to the second edge 1104. The fluted sheet 1100 can include first flutes 1106 on one side of the fluted sheet 1100 and second flutes 1108 on the opposite side of the fluted sheet 1100. The flutes 1106, 1108 can be asymmetric, such as when the first flutes 1106 have a different shape than the second flutes 1108. Fluted sheet 1100 in FIG. 11 does not contain a ridge, as shown in other embodiments such as the ridge 326 depicted in FIG. 3. Instead, the fluted sheet 110 contains a curved profile. Also, in the depicted embodiment the peaks of the flutes contain a single rows of protrusions 1116 and 1118 positioned at the peak of each flute 1106 and 1108.

Figure 12:
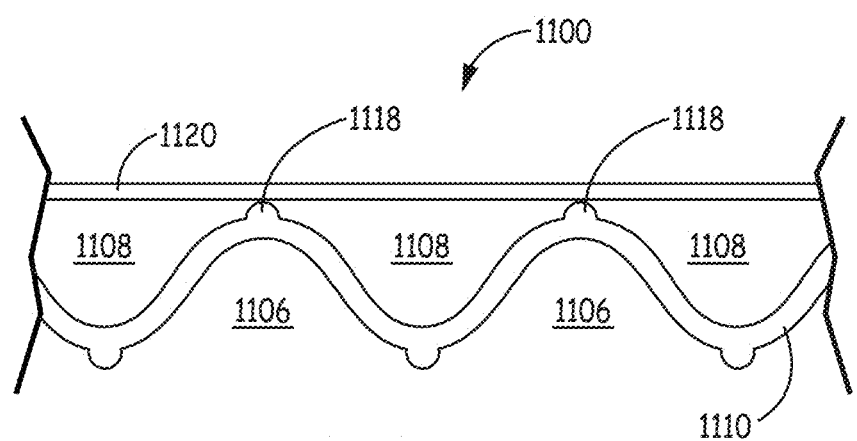
FIG. 12 is a front view of a sheet of fluted filter media and a sheet of facer media, constructed and arranged according to an embodiment of the invention shown in FIG. 11.

FIG. 12 is a front view of a sheet of fluted filter media and a sheet of facer media 1100, constructed and arranged according to an embodiment of the invention shown in FIG. 11. The facing sheet 1120 can be substantially planar. In an embodiment, the facing sheet 1120 can include a first surface 1122 and a second surface 1124. Facing sheet 1120 contacts a plurality of protrusions 1116 in fluted sheet 1100, which reduce masking between the fluted sheet 1110 and second surface 1124 of the facing sheet 1120 by limiting contact between the fluted and facing sheets 1110, 1120.

Figure 13:
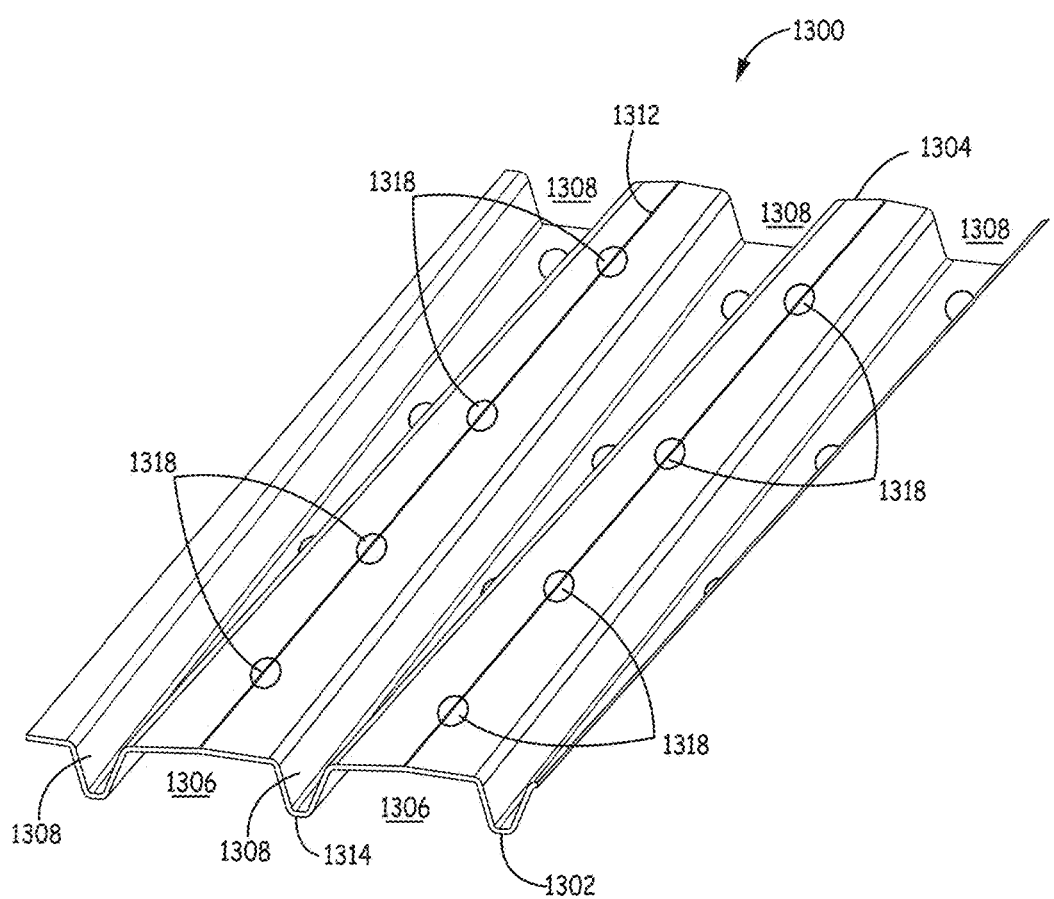
FIG. 13 is a perspective view of a sheet of fluted filter media, constructed and arranged according to an embodiment of the invention, showing single protrusions on the fluted media sheet.

FIG. 13 is a perspective view of a sheet of fluted filter media, constructed and arranged according to an embodiment of the invention, showing single protrusions on the fluted media sheet 1300. The fluted sheet 1300 can include a first edge 1302 and a second edge 1304. The fluted sheet 1300 can include one or more flutes 1306, such as a channel or a peak and a valley. The flutes 1306 can extend from the first edge 1302 to the second edge 1304. The fluted sheet 1300 can include first flutes 1306 on one side of the fluted sheet 1300 and second flutes 1308 on the opposite side of the fluted sheet 1300. The flutes 1306, 1308 can be asymmetric, such as when the first flutes 1306 have a different shape than the second flutes 1308.

Figure 14:
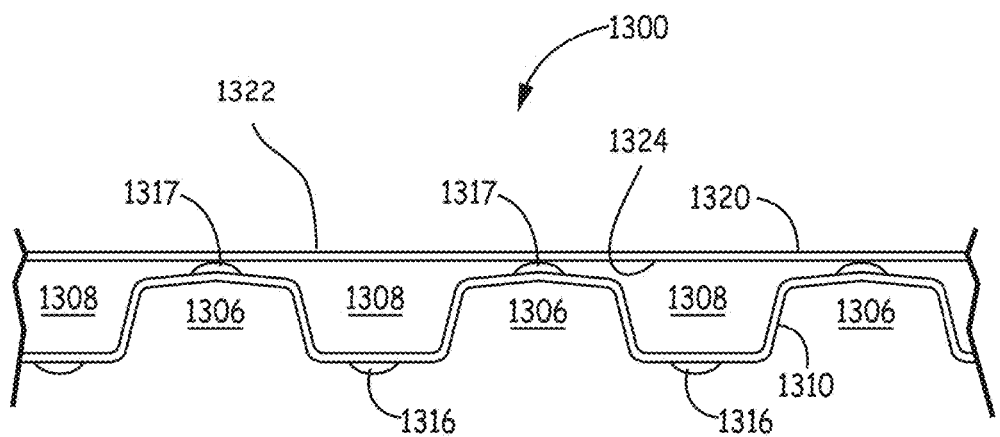
FIG. 14 is a front view of a sheet of fluted filter media and a sheet of facer media, constructed and arranged according to an embodiment of the invention shown in FIG. 13.

FIG. 14 is a front view of a sheet of fluted filter media 1310 and a sheet of facer media 1320, constructed and arranged according to an embodiment of the invention shown in FIG. 13. The facing sheet 1320 can be substantially planar. In an embodiment, the facing sheet 1320 can include a first surface 1322 and a second surface 1324. Facing sheet 1320 contacts a plurality of protrusions 1316 in fluted sheet 1300, which reduce masking between the fluted sheet 1310 and second surface 1324 of the facing sheet 1320 by limiting contact between the fluted and facing sheets 1310, 1320.

Figure 15:
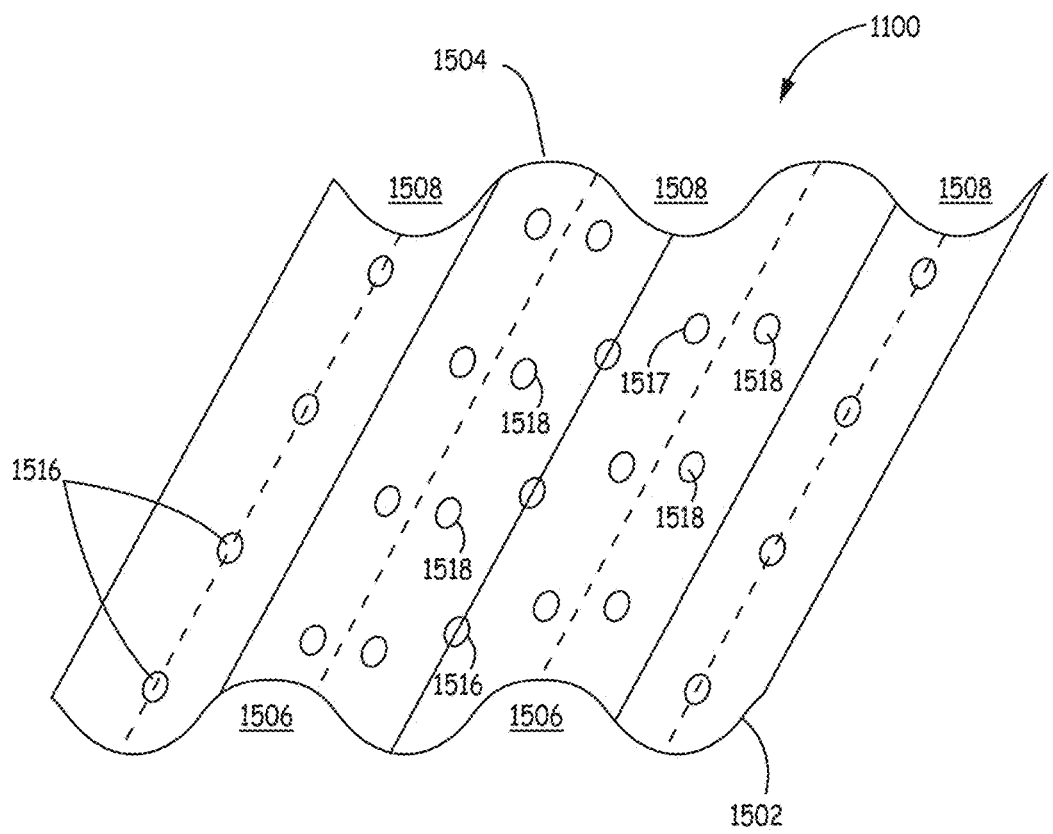
FIG. 15 is a perspective view of a sheet of fluted filter media, constructed and arranged according to an embodiment of the invention.

FIG. 15 is a perspective view of a sheet of fluted filter media, constructed and arranged according to an embodiment of the invention. The fluted sheet 1500 can include a first edge 1502 and a second edge 1504. The fluted sheet 1500 can include one or more flutes 1506, such as a channel or a peak and a valley. The flutes 1506 can extend from the first edge 1502 to the second edge 1504. The fluted sheet 1500 can include first flutes 1506 on one side of the fluted sheet 1500 and second flutes 1508 on the opposite side of the fluted sheet 1500. The flutes 1506, 1508 can be asymmetric, such as when the first flutes 1506 have a different shape than the second flutes 1508.

Figure 16:
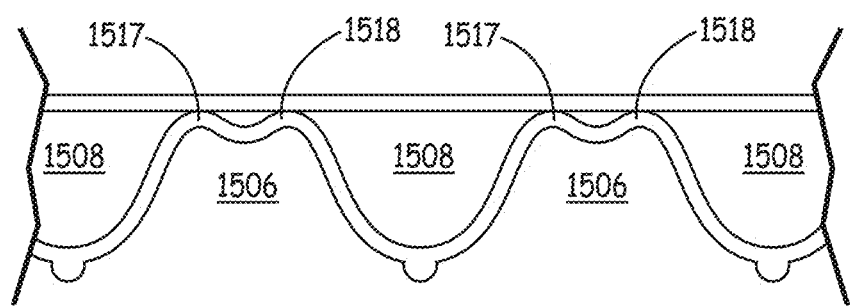
FIG. 16 is a front view of a sheet of fluted filter media and a sheet of facer media, constructed and arranged according to an embodiment of the invention shown in FIG. 15.

FIG. 16 is a front view of a sheet of fluted filter media and a sheet of facer media, constructed and arranged according to an embodiment of the invention shown in FIG. 15. The facing sheet 1520 can be substantially planar. In an embodiment, the facing sheet 1520 can include a first surface 1522 and a second surface 1524. Facing sheet 1520 contacts a plurality of protrusions 1516 in fluted sheet 1500, which reduce masking between the fluted sheet 1510 and second surface 1524 of the facing sheet 1520 by limiting contact between the fluted and facing sheets 1510, 1520.

Figure 17:
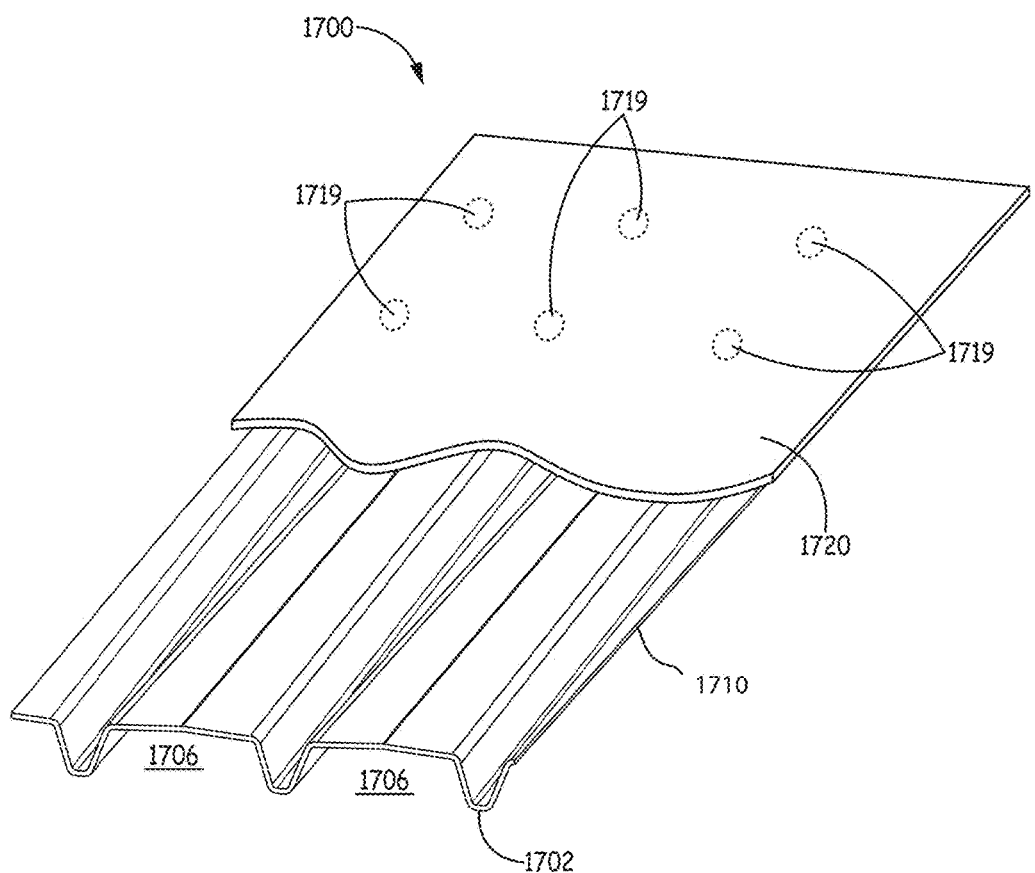
FIG. 17 is a perspective view of a sheet of fluted filter media and a sheet of facer media, constructed and arranged according to an embodiment of the invention.

FIG. 17 is a perspective view of a sheet of fluted filter media and a sheet of facer media 1700, constructed and arranged according to an embodiment of the invention, including a fluted sheet 1710 and a facing sheet 1720. The facing sheet 1720 can be substantially planar. Facing sheet 1720 contains a plurality of protrusions 1719, while the fluted sheet 1710 in the example embodiment does not contain protrusions. Thus, in this embodiment the protrusions 1719, projecting downward toward the peak of the fluted sheet 1710 reduces masking between the fluted sheet 1710 and surface of the facing sheet 1720 by limiting contact between the fluted and facing sheets 1710, 1720.

Figure 18:
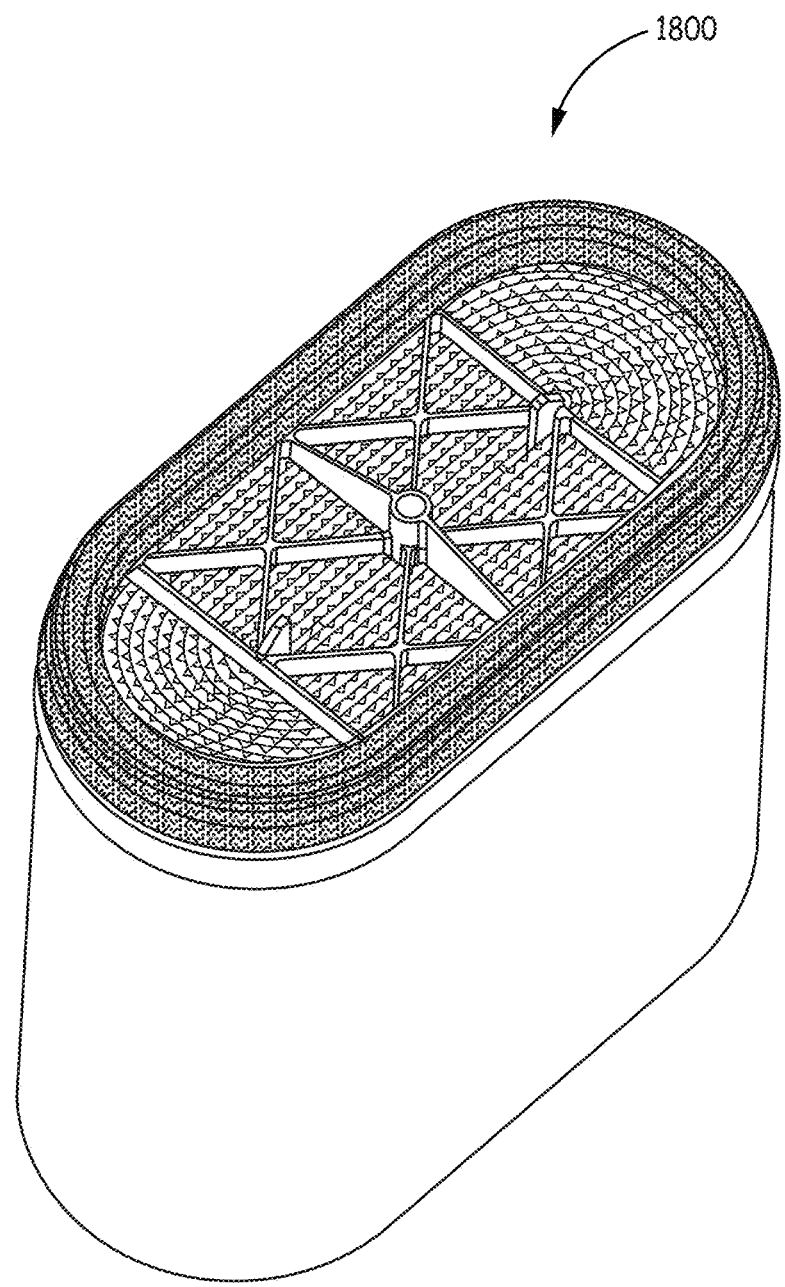
FIG. 18 is a perspective view of a filter element constructed and arranged according to an embodiment of the invention.

FIG. 18 is a perspective view of a filter element 1800 constructed and arranged according to an embodiment of the invention. Filter element 1800 contains a plurality of sheets of filter media. The filter element 1800 can include a filtration media pack. The filtration media pack can include the fluted media with protrusions as described herein. The filter element can include a housing, such as to provide support for the single face media or configure the filter element to be mounted. In example embodiments the filter element 1800 is from 2 to 20 inches deep, in other embodiments the filter element 1800 is from 2 to 16 inches deep, in yet other embodiments the filter element is from 2 to 12 inches deep. In some embodiments the filter element 1800 is from 6 to 20 inches deep, in other embodiments the filter element 1800 is from 6 to 16 inches deep, in yet other embodiments the filter element 1800 is from 6 to 12 inches deep. Suitable filter elements 1800 can be, for example, from 6 to 10 inches deep. The constructions of the present invention, with protrusions separating the fluted and facing sheets, is particularly advantageous with relatively deeper filter elements.

In certain implementations, the protrusions in the filter media described herein can have a height at least equal to the thickness of the media. In other implementations the protrusions have a height of at two times the thickness of the media; in other implementations the protrusions have a height of at three times the thickness of the media; in other implementations the protrusions have a height of at four times the thickness of the media; in other implementations the protrusions have a height of from two five times the thickness of the media; in yet other implementations the protrusions have a height of from two to ten times the thickness of the media.

The protrusions can also be measured by their height relative to the flute height. The flute height is that distance from the facing sheet to top of the flute. In some implementations the protrusions are less than 90 percent of the height of the flute, alternatively less than 75 percent of the height of the flute, and alternatively less than 50 percent of the height of the flute. In some implementations the protrusions are at least 10 percent of the height of the flute, alternatively at least 20 percent of the height of the flute, and alternatively at least 30 percent of the height of the flute. In some implementations the protrusions are from 10 to 90 percent of the height of the flute; in other implementations the protrusions are from 20 to 75 percent of the height of the flute, and in yet other implementations the protrusions are from 25 to 50 percent of the height of the flute.

The protrusions can also be measured by their height relative to the flute width. The flute width is that distance between adjacent same side peaks of the fluted sheet. In some implementations the protrusions are less than 40 percent of the width of the flute, alternatively less than 30 percent of the width of the flute, and alternatively less than 25 percent of the width of the flute. In some implementations the protrusions are at least 1 percent of the width of the flute, alternatively at least 5 percent of the width of the flute, and alternatively at least 10 percent of the width of the flute. In some implementations the protrusions are from 1 to 40 percent of the width of the flute; in other implementations the protrusions are from 2 to 20 percent of the width of the flute, and in yet other implementations the protrusions are from 3 to 10 percent of the width of the flute.

The protrusions are positioned on the peak, or maximum height point, of the flutes in some implementations, while in other implementations the protrusions are placed on one or both sides of the flute peak. In some implementations the peak of the flute is sharp or has a small radius, while in other implementations the peak has a gradual curve or is substantially flat.

The protrusions can be substantially uniform in height, or can vary. Individual protrusions can have a varied height along its length or width. In addition, the heights of the various protrusions can vary along the length of a flute. The variation in protrusion heights can promote creation of media with tapered flutes that vary in height along their length. In some cases the protrusions will get larger when moving from the upstream side of a media pack to the downstream side. In other implementations the protrusions are symmetrically aligned on both sides of axis of flute.

The fluted media containing the protrusion on the flutes can demonstrate area or volume asymmetry. In the context of z-media, In general, area asymmetry refers to an asymmetry in flute cross-sectional area, and can be exhibited by tapered flutes. For example, area asymmetry exists if a fluted area at one location along the length of a flute is different from the fluted area at another location along the length of the flute. Because tapered flutes exhibit a decrease in size from a first location (e.g., end) to a second location (e.g., end) of the media pack or an increase in size from a first location (e.g., end) to a second location (e.g., end) of the media pack, there is an area asymmetry.

Volumetric asymmetry refers to a difference between a dirty side volume and a clean side volume within the filter media pack. Flute volume asymmetry refers to a volumetric difference within a filter element or filter cartridge between the upstream volume and the downstream volume. The upstream volume refers to the volume of the media that receives the unfiltered fluid (e.g., air), and the downstream volume refers to the volume of the media that receives the filtered fluid (e.g., air). Filter elements can additionally be characterized as having a dirty side and a clean side. In general, the dirty side of filtration media refers to the volume of media that receives the unfiltered fluid. The clean side refers to the volume of media that receives the filtered fluid that has passed via filtering passage from the dirty side.

In certain embodiments the media has a dirty side or upstream volume that is greater than the clean side or downstream volume. It has been observed that in the case of filtering air, particulates in the air are deposited on the dirty side and, as a result, the capacity of the filtration media can be determined by the volume of the dirty side. By providing volume asymmetry, it is possible to increase the volume of the media available for receiving the dirty air and thereby increase the capacity of the media pack.

Filtration media have a flute volume asymmetry can be referred to as a media pack having an asymmetric volume arrangement. Desirably, media exhibiting volume asymmetry has volume asymmetry of greater than about 10%, greater than about 20%, greater than 30%, and preferably greater than about 50%. Exemplary ranges for flute volume asymmetry include about 30% to about 250%, and about 50% to about 200%. In general, it may be desirable for the upstream volume to be greater than the downstream volume when it is desirable to maximize the life of the media. Alternatively, there may be situations where it is desirable to minimize the upstream volume relative to the downstream volume. For example, in the case of a safety element, it may be desirable to provide a safety element having a relatively low upstream volume so that the media fills and prevents flow relatively quickly as an indicator that failure has occurred in an upstream filter element.

Filter element or filter cartridge configurations utilizing z-filter media are sometimes referred to as "straight through flow configurations" or by variants thereof. In general, in this context what is meant is that the serviceable filter elements generally have an inlet flow end (or face) and an exit flow end (or face), with flow entering and exiting the filter cartridge in generally the same straight through direction. The term "straight through flow configuration" disregards, for this definition, air flow that passes out of the media pack through the outermost wrap of facing media. In some instances, each of the inlet flow end and outlet flow end can be generally flat or planar, with the two parallel to one another. However, variations from this, for example non-planar faces, are possible in some applications.

The term "z-filter media construction" and variants thereof as used herein, without more, is meant to refer to any or all of: a single facer media containing a fluted media sheet and a facing media sheet with appropriate closure to inhibit air flow from one flow face to another without filtering passage through the filter media; and/or, a single facer media that is coiled or stacked or otherwise constructed or formed into a three dimensional network of flutes; and/or, a filter construction including a single facer media; and/or, a fluted media constructed or formed (e.g., by folding or pleating) into a three dimensional network of flutes. In general, it is desirable to provide an appropriate flute closure arrangement to inhibit unfiltered air that flows in one side (or face) of the media from flowing out the other side (or face) of the media as part of the filtered air stream leaving the media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face.

In general, the filter media is a relatively flexible material, typically a non-woven fibrous material (of cellulose fibers, synthetic fibers or both) often including a resin therein, sometimes treated with additional materials. In some embodiments the media fibers are primarily cellulosic. The media generally can be conformed or configured into the various fluted, for example corrugated, patterns, without unacceptable media damage. Also, it can be readily coiled or otherwise configured for use, again without unacceptable media damage. Also, typically, the media can contain a resin. During the corrugation process, the media can be heated to above the glass transition point of the resin. When the resin then cools, it will help to maintain the fluted shapes.

The filtration media can be provided as a relatively flexible media, including a non-woven fibrous material containing cellulose fibers, synthetic fibers, glass fibers, ceramic fibers, or combinations thereof, often including a resin therein, and sometimes treated with additional materials. An example filtration media can be characterized as a cellulosic filtration media that can tolerate about up to twelve percent (12%) strain without tearing when wet and warm, but which will often rupture at lower percent strain when dry and cold (as low as 3% with some media). In an embodiment, the filtration media comprises cellulose. In an embodiment, the fibers forming the filtration media can include at least 25% cellulose, at least 50% cellulose, or at least 75% cellulose. The filtration media can be fluted to form fluted filtration media without unacceptable media degradation. In addition, the filtration media is desirably of a nature such that it will maintain its configuration, during use. While some filtration media is available that can tolerate greater than about twelve percent (12%) strain, and such media can be used according to the invention, such media is typically more expensive because of the need to incorporate relatively large amounts of synthetic fibers.

In the dimpling process, an inelastic deformation is caused to the media. This prevents the media from returning to its original shape. However, once the forming displacements are released, the protrusions will sometimes tend to spring partially back, maintaining only a portion of the stretch and bending that has occurred. Also, the media can contain a resin. During the dimpling process, the media can be heated to soften the resin. When the resin cools it helps to maintain the embossed shapes.

In an embodiment, the filter media can have a modulus of elasticity of greater than 10,000 pounds per square inch. In an embodiment, the filtration media can have a modulus of elasticity of less than 75,000 pounds per square inch.

The filtration media can be provided with a fine fiber material on one or both sides thereof, for example, in accord with U.S. Pat. Nos. 6,955,775, 6,673,156, and 7,270,693, incorporated herein by reference in their entirety. In general, fine fiber can be referred to as polymer fine fiber (microfiber and nanofiber) and can be provided on the media to improve filtration performance.

The fine fiber can be added at various stages of the manufacturing process. For example, in some implementations the media will contain fine fiber before the protrusions are formed, while in other implementations the fine fiber is added as a layer or layers to the media. As a result of the presence of fine fiber on the media, it can be possible to provide media having a reduced weight or thickness while obtaining desired filtration properties. Accordingly, the presence of fine fiber on the media can provide enhanced filtration properties, provide for the use of thinner media, or both. Exemplary materials that can be used to form the fine fibers include polyvinylidene chloride, polyvinyl alcohol polymers, polyurethane, and co-polymers comprising various nylons such as nylon 6, nylon 4,6, nylon 6,6, nylon 6,10, and co-polymers thereof, polyvinyl chloride, PVDC, polystyrene, polyacrylonitrile, PMMA, PVDF, polyamides, and mixtures thereof.

Referring now to FIGS. 19 to 32, the relationship of various media and element properties is shown for various example embodiments of the invention in schematic form. In these constructions the x-axis shows distance from the downstream end of the flute. Thus the "0" point represents the downstream end of the flute, and the "300" point near the upstream end of the flute. The upstream end of the flute is located at the face of the media pack where fluids to be filtered enter the element, while the downstream end of a flute is located at the face of the media pack where fluids to be filtered exit the element.

Figure 19:
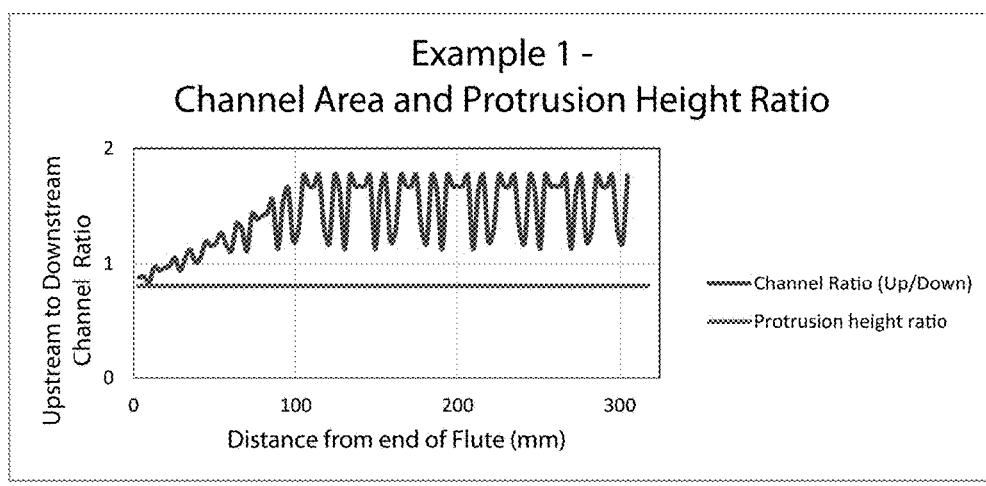
FIG. 19 is a graphical representation of channel area and protrusion height ratios of a filter media constructed and arranged in accordance with a first example embodiment of the invention.
Figure 20:
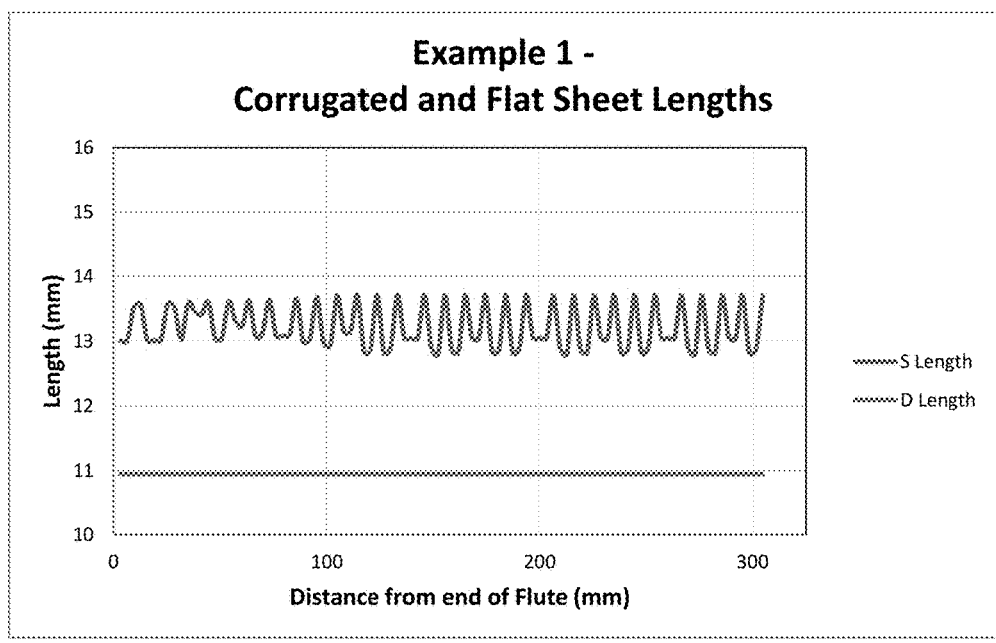
FIG. 20 is a graphical representation of corrugated and flat sheet lengths of a filter media constructed and arranged in accordance with a first example embodiment of the invention.
Figure 21:
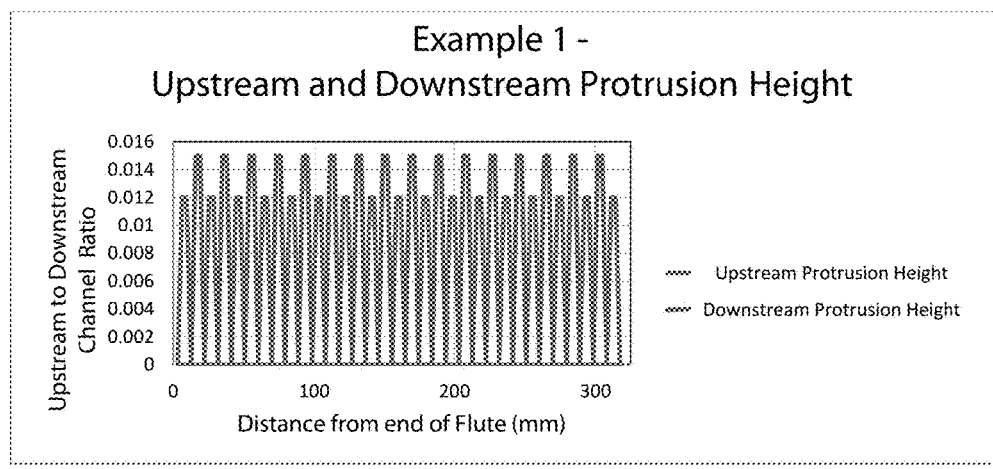
FIG. 21 is a graphical representation of upstream and downstream protrusion heights of a filter media constructed and arranged in accordance with a first example embodiment of the invention.

FIGS. 19 to 21 show data from a first example embodiment of the invention. FIG. 19 is a graphical representation of channel area and protrusion height ratios of a filter media constructed and arranged in accordance with a first example embodiment of the invention. In this example embodiment the protrusion height ratio stays substantially constant, while the channel area ratio, measuring the channel area from the upstream portion of the element to the downstream portion of the element, varies along an approximately 300 mm distance. Thus, the upstream to downstream cross sectional channel area ratio is higher at one end than the other of the media pack. Specifically, the upstream to downstream cross sectional area ratio shows a distinct reduction near the end of the element (near where fluids exit the element). Thus, the element shows channel area asymmetry along most of its length, with the upstream cross sectional area of the element being greater than the downstream cross sectional area of adjacent flutes for most of the length of the element, but this difference in cross sectional area diminishing as flutes progress to the end of the element where fluids exit the element.

FIG. 20 is a graphical representation of corrugated and flat sheet lengths of a filter media constructed and arranged in accordance with this first example embodiment of the invention. FIG. 20 shows how the "D length" of the media, which is the width of one flute of media (such as the length shown in FIG. 7 with annotation "A"), stays substantially constant, while the length of the media along that flute (taken along a cross section of the flute planar to the flute length, which is represented, for example, in FIG. 7 as the length of media along the flute corresponding to the flute width of "A"), which is the "S length", shows modest fluctuations along the flute length. These modest fluctuations in S length are a result of changes in the media length along the flute as the result of the presence or absence of the protrusions along each flute.

FIG. 21 is a graphical representation of upstream and downstream protrusion heights of a filter media constructed and arranged in accordance with a first example embodiment of the invention. FIG. 21 shows how the upstream protrusion height is less than the downstream protrusion height in this example embodiment. Thus, the downstream protrusion heights are greater than the upstream protrusion heights in certain embodiments of the invention. The increased protrusion heights for the downstream protrusions is beneficial in avoiding masking, because the downstream protrusions are sometimes under increased deformation pressure as a result the pressure differential between the upstream and downstream portions of the media pack when under load. In the example embodiment the upstream and downstream protrusions, although different in size compared to one another, are uniform along the length of the element.

Figure 22:
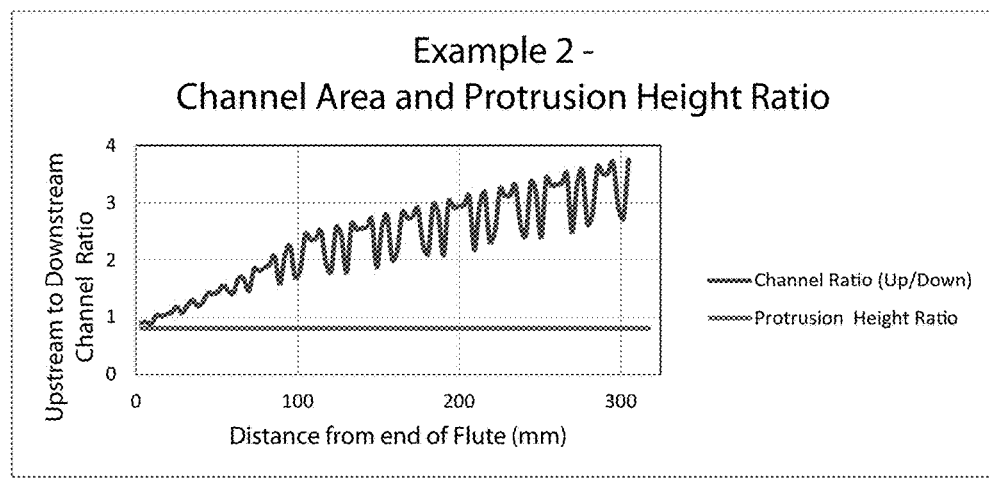
FIG. 22 is a graphical representation of channel area and protrusion height ratios of a filter media constructed and arranged in accordance with a second example embodiment of the invention.
Figure 23:
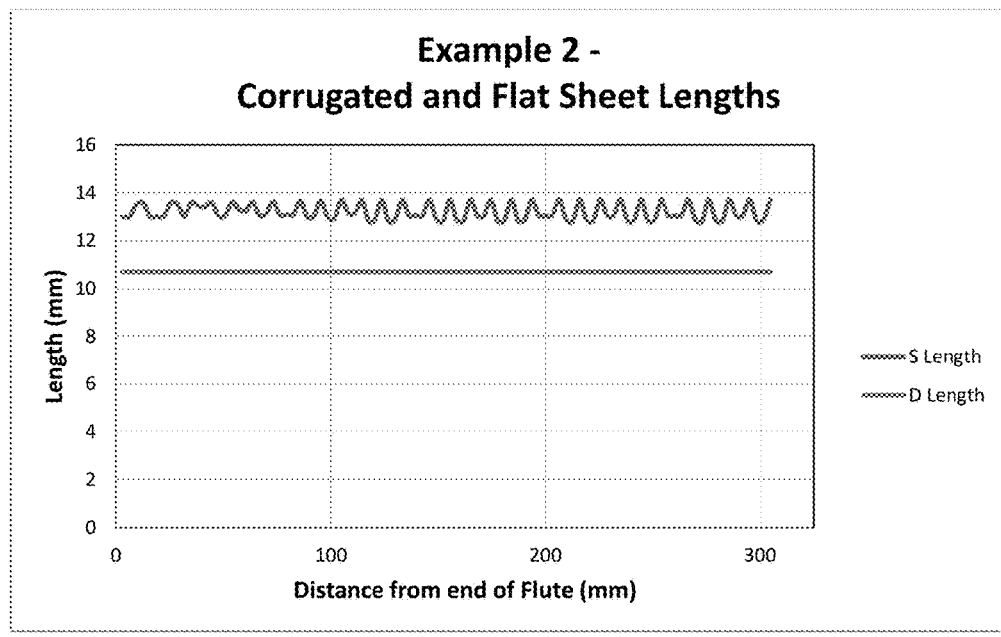
FIG. 23 is a graphical representation of corrugated and flat sheet lengths of a filter media constructed and arranged in accordance with a second example embodiment of the invention.
Figure 24:
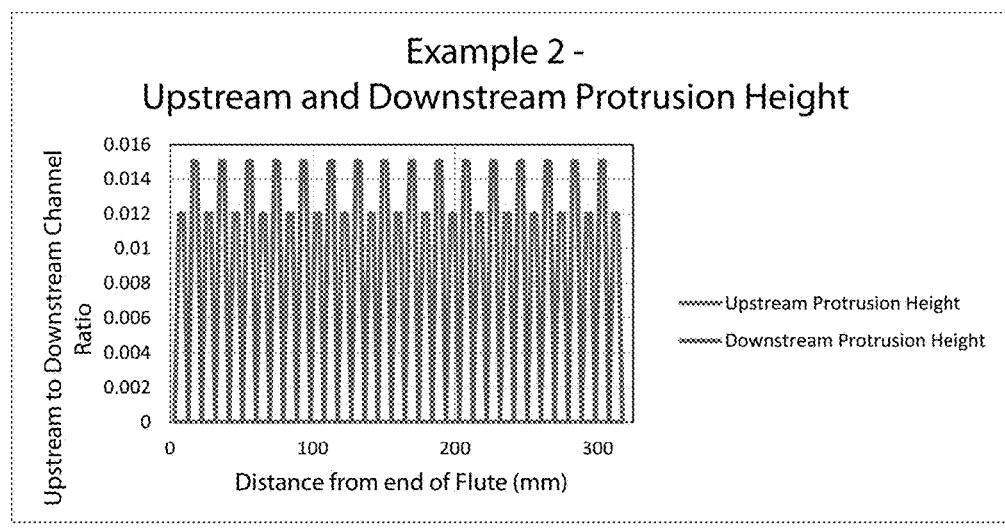
FIG. 24 is a graphical representation of upstream and downstream protrusion heights of a filter media constructed and arranged in accordance with a second example embodiment of the invention.

FIGS. 22 to 24 show element properties for a second example construction, specifically one with a fanned media pack, such as from a cylindrical media pack. FIG. 22 is a graphical representation of channel area and protrusion height ratios of a filter media constructed and arranged in accordance with a second example embodiment of the invention. As is evident from FIG. 22, the dimple height ratio stays substantially constant along the length of the element in FIG. 22, but the upstream to downstream channel area increases along the length of the element. This increase is somewhat variable to reflect changes in area caused by the protrusions and the fanning of the media pack. It will be understood that in some implementations the channel area ratio will show these fluctuations, but the fluctuations will be smaller than shown in FIG. 22.

FIG. 23 is a graphical representation of corrugated and flat sheet lengths of a filter media constructed and arranged in accordance with the second example embodiment of the invention. It is evident from FIG. 23 that the "D Length" of the media, which is the width of one flute of media, is constant, while the while the length of the media along one flute, measured in the flute cross section (taking perpendicular to the lengthwise dimension of the flute), which is the "S length", shows modest fluctuations along the flute length, representing changes from the protrusion height.

FIG. 24 is a graphical representation of upstream and downstream protrusion heights of a filter media constructed and arranged in accordance with the second example embodiment of the invention. FIG. 24 shows how the upstream protrusion height is less than the downstream protrusion height. Thus, the downstream protrusion heights are greater than the upstream protrusion heights in the depicted embodiment. In the example embodiment the upstream and downstream protrusions, although different in size compared to one another, are uniform along the length of the element.

Figure 25:
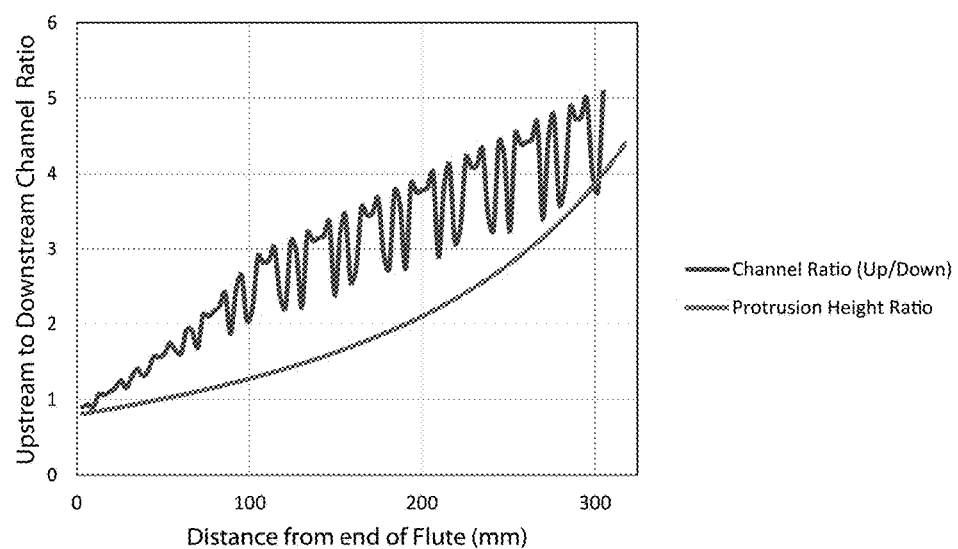
FIG. 25 is a graphical representation of channel area and protrusion height ratios of a filter media constructed and arranged in accordance with a third example embodiment of the invention.
Figure 26:
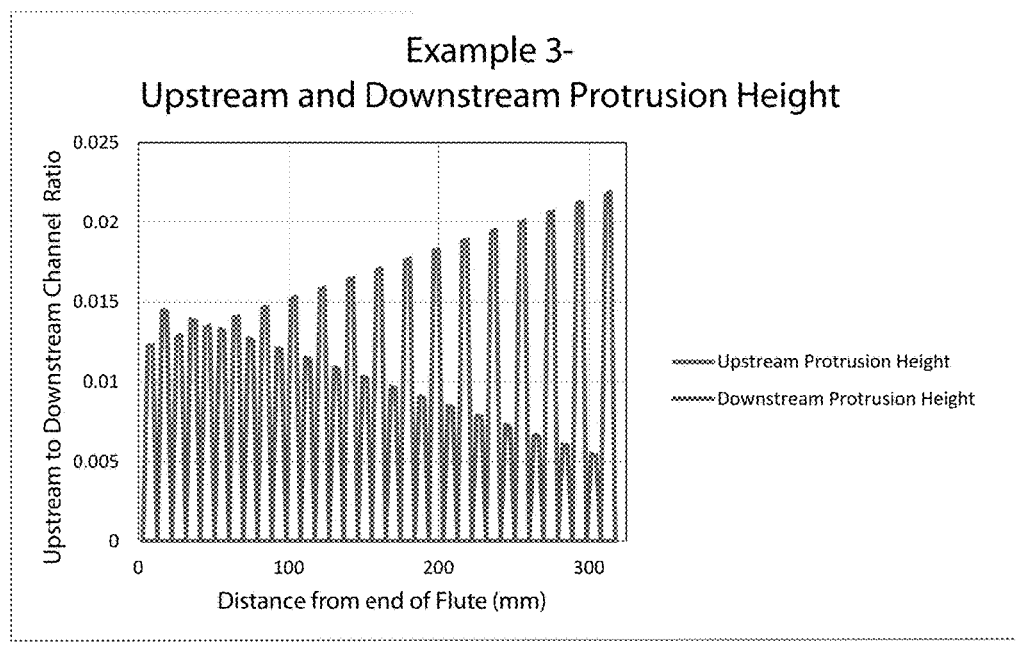
FIG. 26 is a graphical representation of corrugated and flat sheet lengths of a filter media constructed and arranged in accordance with a third example embodiment of the invention.

FIGS. 25 and 26 show element properties for a third example construction, specifically one in which the protrusions are tapered in eight relative to one another. FIG. 25 is a graphical representation of channel area and protrusion height ratios of a filter media constructed and arranged in accordance with a third example embodiment of the invention. FIG. 25 shows how the dimple height ratio decreases deeper into the element, and thus the upstream dimples decrease in size relative to the downstream dimples along the length of the flutes (viewing from right to left in FIG. 25, which is from the entry face to the exit face of the media pack). FIG. 26 is a graphical representation showing how in this example embodiment the upstream protrusion height decreases along the flute, while the downstream protrusion height increases, measured from right to left in FIG. 26.

Figure 27:
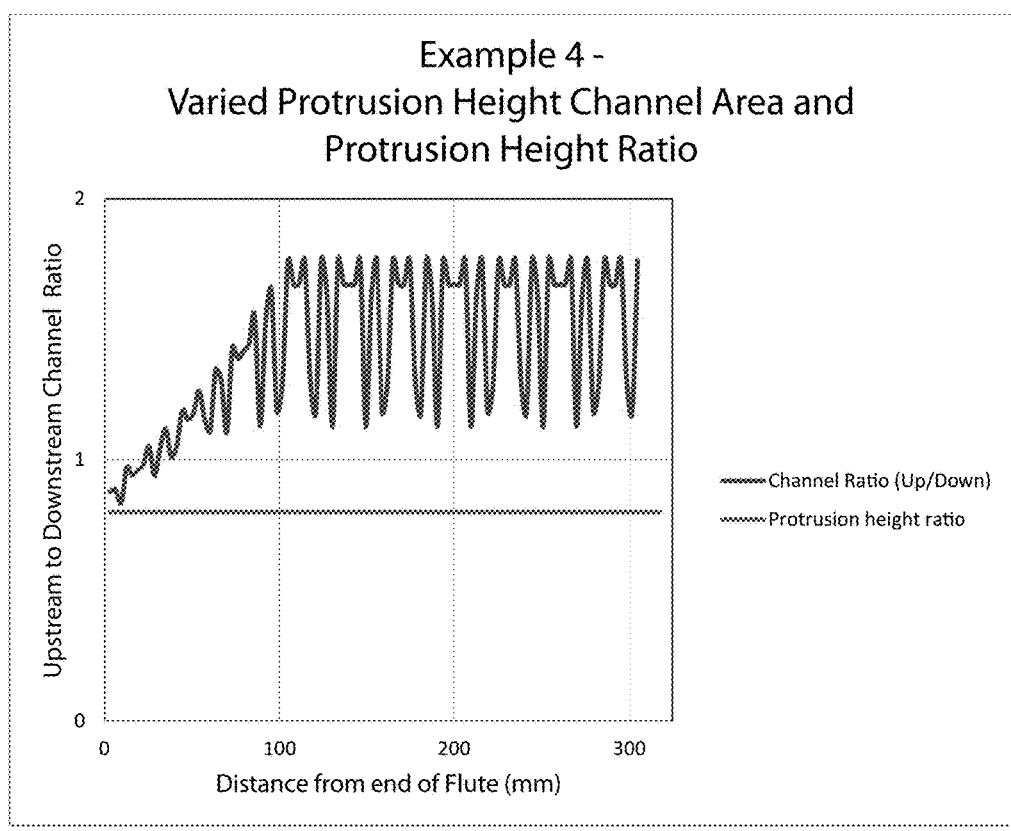
FIG. 27 is a graphical representation of channel area and protrusion height ratios of a filter media constructed and arranged in accordance with a fourth example embodiment of the invention.
Figure 28:
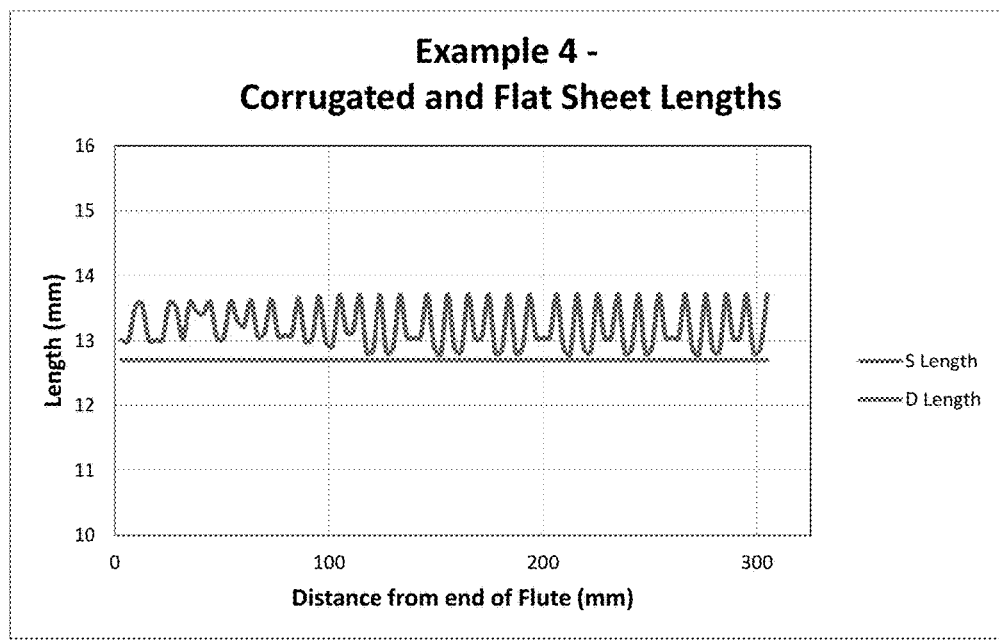
FIG. 28 is a graphical representation of corrugated and flat sheet lengths of a filter media constructed and arranged in accordance with a fourth example embodiment of the invention.
Figure 29:
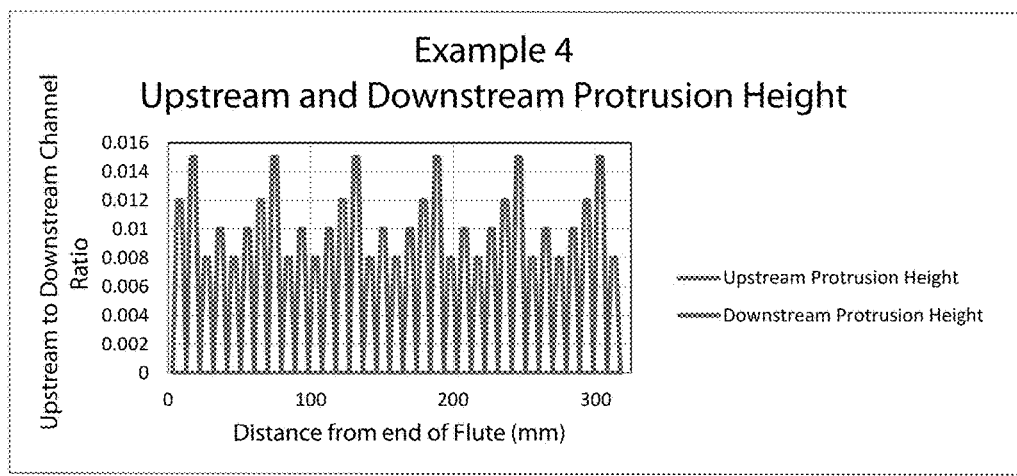
FIG. 29 is a graphical representation of upstream and downstream protrusion heights of a filter media constructed and arranged in accordance with a fourth example embodiment of the invention.

FIG. 27 is a graphical representation of channel area and protrusion height ratios of a filter media constructed and arranged in accordance with a fourth example embodiment of the invention in which the upstream and downstream protrusions have varying heights. FIG. 28 is a graphical representation of corrugated and flat sheet lengths of a filter media constructed and arranged in accordance with this fourth example embodiment of the invention. FIG. 29 is a graphical representation of upstream and downstream protrusion heights of a filter media constructed and arranged in accordance with this fourth example embodiment of the invention.

Figure 30:
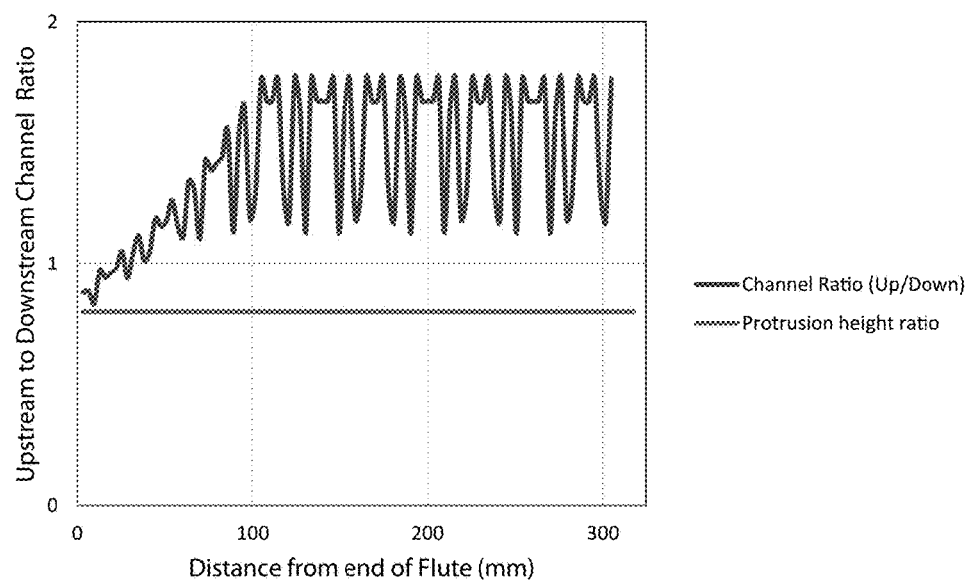
FIG. 30 is a graphical representation of channel area and protrusion height ratios of a filter media constructed and arranged in accordance with a fifth example embodiment of the invention.
Figure 31:
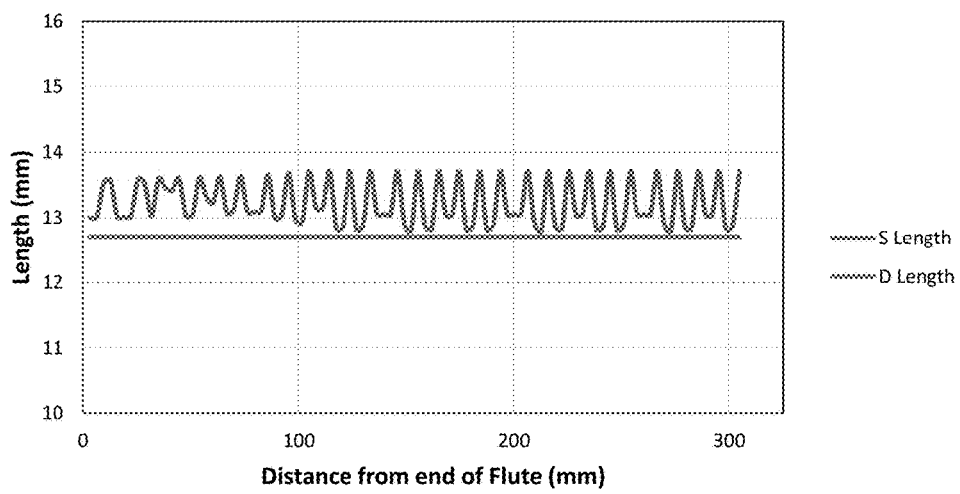
FIG. 31 is a graphical representation of corrugated and flat sheet lengths of a filter media constructed and arranged in accordance with a fifth example embodiment of the invention.
Figure 32:
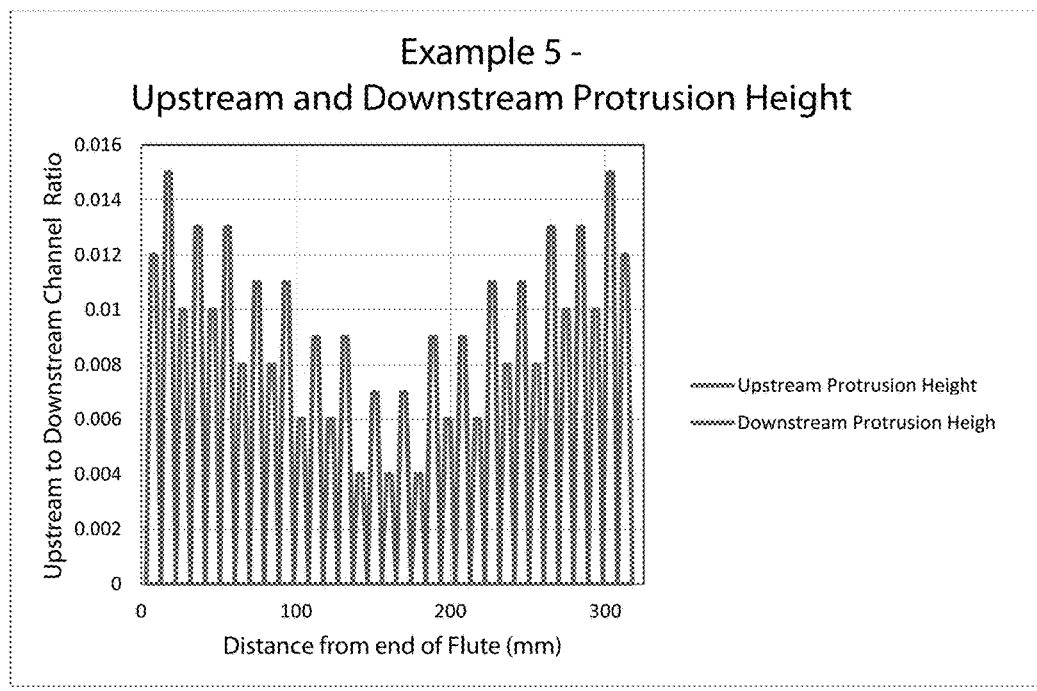
FIG. 32 is a graphical representation of upstream and downstream protrusion heights of a filter media constructed and arranged in accordance with a fifth example embodiment of the invention.

FIGS. 30 to 32 show element properties for a fifth example construction, specifically one with a media pack in which the protrusions have a "wave pattern" in which the dimples are largest at the upstream and downstream ends, and smallest in the middle, of the element. FIG. 30 is a graphical representation of channel area and protrusion height ratios of a filter media constructed and arranged in accordance with a fifth example embodiment of the invention, showing how dimple height ratio stays constant in this configuration, while the upstream to downstream channel area ratio diminishes closet to the downstream end of the element. In other words, the area asymmetry diminishes closer to the downstream end of the element. FIG. 31 is a graphical representation of corrugated and flat sheet lengths of a filter media constructed and arranged in accordance with the fifth example embodiment of the invention. FIG. 32 is a graphical representation of upstream and downstream protrusion heights of a filter media constructed and arranged in accordance with a fifth example embodiment of the invention.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

The invention has been described with reference to various specific and preferred embodiments and techniques. However, it should be understood that many variations and modifications may be made while remaining within the spirit and scope of the invention.

I claim:

1. A filtration media pack comprising:
   (a) a plurality of layers of single face media comprising a fluted sheet, a facing sheet, and a plurality of flutes extending between the fluted sheet and the facing sheet;
   (b) a first portion of the plurality of flutes being closed to unfiltered air flowing into the first portion of the plurality of flutes, and a second portion of the plurality of flutes being closed to unfiltered air flowing out of the second portion of the plurality of flutes, such that air passing into one of the first face or the second face of the media pack and out the other of the first face or the second face of the media pack passes through media to provide filtration of the air; and
   wherein at least one of the flutes comprises at least one contact region between the single face media and the fluted sheet, the contact region comprising at least one permeable protrusion extending from at least one of the facing sheet and fluted sheet.

2. The filtration media pack of claim 1, wherein the protrusion comprises an island.

3. The filtration media pack of claim 1, wherein the protrusions have a height of from 0.2 to 3 millimeters.

4. The filtration media pack of claim 1, wherein the protrusions have a height of from 0.4 to 24 times the thickness of the media forming the fluted sheet.

5. The filtration media pack of claim 1, wherein the protrusions are from 10 to 90 percent of the height of the flutes in the fluted sheet.

6. The filtration media pack of claim 1, wherein the protrusions are less than 30 percent of the height of the flutes in the fluted sheet.

7. The filtration media pack of claim 1, wherein the protrusions are at least 15 percent of the height of the flutes in the fluted sheet.

8. The filtration media pack of claim 1, wherein the protrusions are from 1 to 20 percent of the width of the flutes in the fluted sheet.

9. The filtration media pack of claim 1, wherein the protrusions are less than 10 percent of the width of the flutes in the fluted sheet.

10. The filtration media pack of claim 1, wherein the protrusions are at least 5 percent of the width of the flutes in the fluted sheet.

11. A filtration media pack comprising:
 (a) a plurality of layers of single face media wherein the layer of single face media comprising a fluted sheet, a facing sheet, and a plurality of flutes extending between the fluted sheet and the facing sheet and having a flute length extending from a first face of the filtration media pack to a second face of the filtration media pack;
 (b) a first portion of the plurality of flutes being closed to unfiltered air flowing into the first portion of the plurality of flutes, and a second portion of the plurality of flutes being closed to unfiltered air flowing out of the second portion of the plurality of flutes so that air passing into one of the first face or the second face of the media pack and out the other of the first face of the second face of the media pack passes through media to provide filtration of the air; and
 (c) wherein the fluted sheet comprises:
  (i) repeating internal peaks facing toward the facing sheet and repeating external peaks facing away from the facing sheet; and
  (ii) a repeating pattern of flutes comprising at least one ridge extending along at least a portion of the flute length between adjacent peaks, and
  (iii) a plurality of permeable protrusions extending from the flute and contacting the facing sheet, wherein at least one of the plurality of protrusions is located between a ridge and a peak of the flute.

12. The filtration media pack of claim 11, wherein the plurality of protrusions comprise islands.

13. The filtration media pack of claim 11, wherein the repeating pattern of flutes comprises a protrusion on either side of the peak.

14. The filtration media pack of claim 11, wherein the protrusions are located between the ridge and the peak.

15. The filtration media pack of claim 11, wherein the protrusions are tapered with respect to each other.

16. The filtration media pack of claim 11, wherein the protrusions have a height of from 0.2 to 3 millimeters.

17. The filtration media pack of claim 11, wherein the protrusions have a height of from 0.4 to 24 times the thickness of the media forming the fluted sheet.

18. The filtration media pack of claim 11, wherein the protrusions are from 10 to 90 percent of the height of the flutes in the fluted sheet.

19. The filtration media pack of claim 11, wherein the protrusions are at least 15 percent of the height of the flutes in the fluted sheet.

20. A filtration media pack comprising:
 (a) a plurality of layers of single face media comprising a fluted sheet, a facing sheet, and a plurality of flutes extending between the fluted sheet and the facing sheet;
 (b) a first portion of the plurality of flutes being closed to unfiltered air flowing into the first portion of the plurality of flutes, and a second portion of the plurality of flutes being closed to unfiltered air flowing out of the second portion of the plurality of flutes, such that air passing into one of the first face or the second face of the media pack and out the other of the first face or the second face of the media pack passes through media to provide filtration of the air; and
 wherein the fluted sheet comprises a plurality of permeable protrusions, the protrusions covering only a portion of the fluted sheet.

* * * * *